United States Patent
Lu et al.

(10) Patent No.: US 9,589,160 B2
(45) Date of Patent: Mar. 7, 2017

(54) WORKING METHOD FOR SMART CARD READER

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/408,304

(22) PCT Filed: Jun. 30, 2014

(86) PCT No.: PCT/CN2014/081132
§ 371 (c)(1),
(2) Date: Dec. 16, 2014

(87) PCT Pub. No.: WO2015/085753
PCT Pub. Date: Jun. 18, 2015

(65) Prior Publication Data
US 2016/0292466 A1    Oct. 6, 2016

(30) Foreign Application Priority Data

Dec. 9, 2013   (CN) .......................... 2013 1 0659047

(51) Int. Cl.
*G06K 7/00*      (2006.01)
*H04L 29/06*    (2006.01)

(52) U.S. Cl.
CPC ........ *G06K 7/0013* (2013.01); *H04L 63/0853* (2013.01); *G06K 7/00* (2013.01)

(58) Field of Classification Search
None
See application file for complete search history.

(56) References Cited

U.S. PATENT DOCUMENTS

2012/0080524 A1    4/2012    Adams et al.

*Primary Examiner* — Kristy A Haupt
(74) *Attorney, Agent, or Firm* — Hammer & Associates, P.C.

(57) ABSTRACT

A working method for a smart card reader, which comprises that: the card reader is powered on and initialized; a system mode is set according to a type of a device which connects to the card reader, and determines the system mode; if the system mode is an APPLE® mode, determine whether an APPLE® authenticating operation is required to be re-performed, if the APPLE® authenticating operation is required to be re-performed, perform the APPLE® authenticating operation, waiting for receiving APPLE® data sent by an APPLE® device, the card reader performs corresponding operation in accordance with a type of an instruction; if the system mode is a USB mode, determine whether a USB data transmission flag is set, enable a USB connection and perform a USB enumeration in a case that the USB data transmission is not set, and when the USB enumeration is finished, the USB data transmission flag is set; waiting for receiving a USB data sent by the upper computer in a case that the USB data transmission flag is set, the card reader performs corresponding operation according to the type of the instruction. The present disclosure realizes that the card reader can communicate with not only an upper computer but an iPhone 5 via a USB interface or a lighting interface respectively.

12 Claims, 11 Drawing Sheets

US 9,589,160 B2

WORKING METHOD FOR SMART CARD READER

FIELD OF THE PRESENT INVENTION

The present invention relates to the field of a card reader, in particular, to a working method for a smart card reader.

PRIOR ART

A card reader, which is a device for data transmission and communication, is configured to realize interactive communication between an external device and a memory card. The external device may be a personal computer or other electronic equipment, and the memory card may be a smart card, magnetic card or other type of card.

Generally, a card reader connects to an external device via a USB interface or other serial interface so as to realize data interaction between the card and the external device. In process of receiving and sending data, both the card reader and the external device should follow a data communication protocol. The card reader receives the data, which is in a format stated by the data communication protocol, sent by the external device, and the data is reorganized according to a data communication protocol format that the card which connects to the card reader can accept, and the data is sent to the card; meanwhile, when the card reader receives the data returned by the card, the data is reorganized and returned to the external device according a data communication protocol format that the external device, which connects to the card reader, can accept.

With development of computer and science technology, various mobile phones come up. At the moment, iPhone 5 cell phone, published by Apple Inc., is very popular, nonetheless, in prior art, the smart card reader cannot be used for lightning interface, so it cannot communicate with an iPhone 5 cell phone.

SUMMARY OF THE PRESENT INVENTION

The objective of the present invention is to provide a working method for a smart card reader, which resolves an issue that the smart card reader can be used in an iPhone 5 platform so as to realize communication between the card reader and an iPhone 5 cell phone via a lightning interface and data transmission between a smart chip and a smart platform.

Therefore, the present disclosure provides a working method for a smart card reader, including:

Step S0, powering on the card reader and beginning initialization; wherein initialization includes: a USB transmission flag is reset;

Step S1, setting a system mode according to a type of a device which connects to the card reader;

Step S2, determining the system mode, executing Step S3 in a case that the system mode is an APPLE® mode; executing Step S6 in a case that the system mode is a USB mode;

Step S3, determining whether an APPLE® authenticating operation is required to be re-performed, executing Step S4 in a case that the APPLE® authenticating operation is required to be re-performed; executing Step S5 in a case that the APPLE® authenticating operation is not required to be re-performed;

Step S4, performing the APPLE® authenticating operation, and determining whether the certificating operation is successfully performed, setting that 'the APPLE® authenticating operation is not required to be re-performed' and executing Step S5 in a case that the certificating operation is successfully performed; returning to Step S2 in a case that the certificating operation is not successfully performed;

Step S5, waiting for receiving APPLE® data sent by an APPLE® device, when receiving the APPLE® data, determining a type of an instruction, performing a power-on operation on the card and returning a power-on processing response to the APPLE® device, and returning to Step S2 in a case that the instruction is a power-on instruction; performing a power-off operation on the card and returning a power-off successful response to the APPLE® device, and returning to Step S2 in a case that the instruction is a power-off instruction; in a case that the instruction is a data exchange APDU instruction, APDU data in the data exchange APDU instruction is sent to the card to be processed, when a processed result returned by the card is received, the processed result is returned to the APPLE® device, and returning to Step S2;

Step S6, determining whether the USB data transmission flag is set, executing Step S9 in a case that the USB data transmission flag is set; executing Step S7 in a case that the USB data transmission flag is not set;

Step S7, enabling a USB connection;

Step S8, performing a USB enumerating operation, and determining whether the enumerating operation is finished, the USB data transmission flag is set and executing Step S9 if the enumerating operation is finished; returning to Step S2 is the enumerating operation is not finished;

Step S9, waiting for receiving USB data sent by an upper computer, determining a type of an instruction when the USB data is received, performing a power-on operation on the card and returning a power-on processing response to the upper computer, and returning to Step S2 in a case that the instruction is a power-on instruction; performing a power-off operation on the card and returning a power-on successful response to the upper computer, and returning to Step S2 in a case that the instruction is a power-off instruction; in a case that the instruction is a data exchange APDU instruction, APDU data in the data exchange APDU instruction is sent to the card to be processed, when a processed result returned by the card is received, the processed result is returned to the upper computer, and returning to Step S2.

Preferably, before returning to Step S2, Step S5 further including:

Step F1, determining whether a USB interface connects to a power supply, executing Step F2 in a case that the USB interface connects to a power supply; returning to Step S2 in a case that the USB interface does not connect to a power supply;

Step F2, determining whether an APPLE®-charging event notice is sent to the APPLE® device, executing Step F3 in a case that the APPLE®-charging event notice is sent to the APPLE® device; returning to Step S2 in a case that the APPLE®-charging event notice is not sent to the APPLE® device;

Step F3, the APPLE®-charging event notice is sent to the APPLE® device, and returning to Step S2.

Preferably, Step S1 further including:

Step A1, determining whether the card reader connects to an APPLE® device, executing Step A2 in a case that the card reader connects to an APPLE® device; executing Step A3 in a case that the card reader does not connect to an APPLE® device;

Step A2, setting the system mode as the APPLE® mode, setting the APPLE® authenticating operation is required to be re-performed, and executing Step S2;

Step A3, determining whether the card reader connects to a USB device, executing Step A4 in a case that the card reader connects to a USB device; returning to Step A1 in a case that the card reader does not connect to a USB device;

Step A4, setting the system mode as the USB mode, enabling a USB function, and executing Step S2;

Preferably, before returning to Step S2, Step S5 further including: determining whether the APPLE® device is pulled out, initializing a flag under the APPLE® mode, and returning to Step S2 in a case that the APPLE® device is pulled out; returning to Step S2 in a case that the APPLE® device is not pulled out; and before returning to Step S2, Step S9 further including: determining whether the card reader connects to an APPLE® device, disabling the USB connection and setting the system mode as the APPLE® mode, and initializing the flag under the USB mode, setting that the APPLE® authenticating operation is required to be re-performed, and returning to Step S2 in a case that the card reader connects to an APPLE® device; returning to Step S2 directly in a case that the card reader does not connect to an APPLE® device;

Preferably, Step S1 further including:

Step B1, determining whether the card reader connects to a USB device, executing Step B2 in a case that the card reader connects to a USB device; returning to Step B3 in a case that the card reader does not connect to a USB device;

Step B2, setting the system mode as the USB mode, enabling the USB function, and executing Step S2;

Step B3, determining whether the card reader connects to an APPLE® device, executing Step B4 in a case that the card reader connects to an APPLE® device; returning to Step B1 in a case that the card reader does not connect to an APPLE® device; and Step B4, setting the system mode as the APPLE® mode, and setting that the APPLE® authenticating operation is required to be re-performed, and executing Step S2.

Preferably, before returning to Step S2, Step S5 further including: determining whether the card reader connects to a USB device, setting the system mode as the USB mode and resetting the USB data transmission flag, initializing the flag under the APPLE® mode, and returning to Step S2 in a case that the card reader connects to a USB device; returning to Step S2 directly in a case that the card reader does not connect to a USB device; and before returning to Step S2, Step S9 further including: determining whether the USB device is pulled out, disabling the USB connection and returning to Step S2 in a case that the USB device is pulled out; returning to Step S2 in a case that the USB device is not pulled out.

Preferably, Step S1 further including: starting a timer to time;

when the time timed by the timer reaches a preset time, entering a timer interruption;

the timer interruption including:

Step P1, clearing a interrupt flag in the timer;

Step P2, determining whether the card reader connects to an APPLE® device, executing Step P3 in a case that the card reader connects to an APPLE® device; executing Step P4 in a case that the card reader does not connect to an APPLE® device;

Step P3, setting the system mode as the APPLE® mode, and executing Step P5;

Step P4, setting that the APPLE® authenticating operation is not required to be re-performed, and executing Step P5;

Step P5, determining whether the card reader connects to a USB device, executing Step S6 in a case that the card reader connects to a USB device; executing Step P7 in a case that the card reader does not connect to a USB device;

Step P6, setting the system mode as the USB mode, and exiting the timer interruption;

Step P7, resetting the USB data transmission flag, and exiting the timer interruption.

Preferably, performing the APPLE® authenticating operation, including:

Step S4-1, waking up, by the card reader, an APPLE® certification chip;

Step S4-2, sending a first preset instruction to the APPLE® device, and waiting for receiving a first response returned by the APPLE® device;

Step S4-3, determining whether the first response is received, executing Step S4-4 in a case that the first response is received; executing Step S4-9 in a case that the first response is not received;

Step S4-4, sending accessory configuration information to the APPLE® device, and waiting for receiving a configuration response returned by the APPLE® device; wherein the accessory configuration information including a rechargeable flag, and the configuration response including a set rechargeable flag;

Step S4-5, determining whether the configuration response is received, executing Step S4-6 in a case that the configuration response is received; executing Step S4-9 in a case that the configuration response is not received;

Step S4-6, sending a second preset instruction to the APPLE® device, and waiting for receiving a second response returned by the APPLE® device;

Step S4-7, determining whether the second response is received, executing Step S4-8 in a case that the second response is received; executing Step S4-9 in a case that the second response is not received;

Step S4-8, determining whether a certificating instruction sent by the APPLE® device is received in the preset time, executing Step S4-10 in a case that the certificating instruction sent by the APPLE® device is received in the preset time; otherwise, executing Step S4-9;

Step S4-9, setting a flag configured to mark that an APPLE® certification accessory is incorrect and a re-certification flag, and the APPLE® certification chip is dormant, and performing the APPLE® authenticating operation is finished;

Step S4-10, determining whether the received certificating instruction is a certification accessory instruction, executing Step S4-11 in a case that the certificating instruction is the certification accessory instruction; returning to Step S4-8 in a case that the certificating instruction is not the certification accessory instruction;

Step S4-11, reading a length of an APPLE® certificate from the APPLE® certification chip, reading contents of the certificate from the APPLE® certification chip according to the length of the APPLE® certificate;

Step S4-12, sending the contents of the certificate to the APPLE® device;

Step S4-13, waiting for receiving a challenge value sent by the APPLE® device, and determining whether the challenge value is received, executing Step S4-14 in a case that the challenge value is received; or returning to Step S4-13 in a case that the challenge value is not received;

Step S4-14, sending the received challenge value to the APPLE® certification chip;

Step S4-15, waiting for receiving a signature result returned by the APPLE® certification chip, and determine whether the signature result is received, executing Step S4-16 in a case that the signature result is received; or returning to S4-15 in a case that the signature result is not received;

Step S4-16, sending the received signature result to the APPLE® device;

Step S4-17, waiting for receiving a certification response returned by the APPLE® device, and determining whether a correct certification response is received, the APPLE® certification chip is dormant and performing the APPLE® authenticating operation is finished in a case that the correct certification response is received; executing Step S4-18 in a case that the correct certification response is not received;

Step S4-18, setting the flag configured to mark the APPLE® certification accessory is incorrect and the re-certification flag, the APPLE® certification chip is dormant, and performing the APPLE® authenticating operation is finished.

Preferably, between Step S4-12 and Step S4-13, the method further including:

Step S4-12', determining whether all of the contents of the certificate are sent, executing Step S4-13 in a case that all of the contents of the certificate are sent; continuing to send left contents to the APPLE® device and executing Step S4-12' in a case that not all of the contents of the certificate are sent.

Preferably, Step S5 including:

Step S5-1, waiting for receiving the APPLE® data sent by the APPLE® device;

Step S5-2, determining whether all of the APPLE® data is received, executing Step S5-3 in a case that all of the APPLE® data is received; returning to Step S5-1 in a case that not all of the APPLE® data is received;

Step S5-3, determining whether the received APPLE® data is an answer class instruction, returning an answer response to the APPLE® device and returning to Step S5-1 if the received APPLE® data is an answer class instruction; executing Step S5-4 if the received APPLE® data is not an answer class instruction;

Step S5-4, obtaining an instruction flag in the received APPLE® data;

Step S5-5, determining the type of the received APPLE® data, returning the instruction flag and a first APPLE®E response to the APPLE® device and returning to Step S5-1 in a case that the received APPLE® data is the first preset instruction; executing Step S5-6 in a case that the received APPLE® data is a data processing instruction; returning the instruction flag and a second APPLE® response to the APPLE® device and returning to Step S5-1 in a case that the received APPLE® data is the second preset instruction;

Step S5-6, returning the instruction flag and a data processing instruction response to the APPLE® device;

Step S5-7, determining whether the received APPLE® data is a write-user-cache-memory instruction, writing the received APPLE® data into an user cache memory, returning a successfully-writing response to the APPLE® device, and returning to Step S5-1 in a case that the received APPLE® data is a write-user-cache-memory instruction; executing Step S5-8 in a case that the received APPLE® data is not a write-user-cache memory instruction;

Step S5-8, determining whether the received APPLE® data meets a format of CCID instruction, executing Step S5-9 in a case that the received APPLE® data meets the format of CCID instruction; returning a response that CCID instruction is not applied to the APPLE® data to the APPLE® device, and returning to Step S5-1 in a cast that the received APPLE® data does not meet the format of CCID instruction;

Step S5-9, determining a character type in the received APPLE® data, executing Step S5-10 in a case that the character type is a first preset value; performing corresponding operation in a case that the character type is other value;

Step S5-10, determining the type of the instruction according to the received APPLE® data, performing the power-on operation on the card and returning the power-on processing response to the APPLE® device and executing Step S5-11 in a case that the instruction is a power-on instruction; performing the power-off operation on the card and returning the power-off successful response to the APPLE® device and executing Step S5-11 in a case that the instruction is a power-off instruction; in a case that the instruction is a data exchange APDU instruction, the APDU data in the data exchange APDU instruction is sent to the card to be processed, when the processed result returned by the card is received, the processed result is returned to the APPLE® device, and returning to Step S5-11; and Step S5-11, determining whether a card reader chip meets a power-off condition, sending the power-off instruction to the card reader chip, and returning to Step S2 if the card reader chip meets a power-off condition; returning to Step S2 if the card reader chip does not meet a power-off condition.

Preferably, Step S9 including:

Step S9-1, waiting for receiving the USB data sent by the upper computer;

Step S9-2, determining whether all of the USB data is received, executing Step S9-3 if all of the USB data is received; executing Step S9-1 if not all of the USB data is received;

Step S9-3, determining whether the received USB data is the write-user-cache-memory instruction, if yes, writing the received USB data into the user cache memory, and returning the successfully writing response to the upper computer, and returning to S9-1 in a case that the received USB data is the write-user-cache-memory instruction; executing Step S9-4 in a case that the received USB data is not the write-user-cache-memory instruction;

Step S9-4, determining whether the received USB data meets the format of CCID instruction, executing Step S9-5 in a case that the received USB data meets the format of CCID instruction; returning CCID instruction is not applied to the USB data to the upper computer, and returning to Step S9-1 in a case that the received USB data does not meet the format of CCID instruction;

Step S9-5, determining a character type in the received USB data, executing Step S9-6 in a case that the character type is the first preset value; performing corresponding operation in a case that the character type is other value;

Step S9-6, determining the type of the instruction according to the received USB data, performing the power-on operation on the card and returning the power-on processing response to the APPLE® device and executing Step S9-7 in a case that the instruction is a power-on instruction; performing the power-off operation on the card and returning the power-off successful response to the APPLE® device and executing Step S9-7 in a case that the instruction is a power-off instruction; in a case that the instruction is a data exchange APDU instruction, the APDU data in the data exchange APDU instruction is sent to the card to be processed, when the processed result returned by the card is received, the processed result is returned to the APPLE® device, and returning to Step S9-7;

Step S9-7, determining whether the card reader chip meets a power-off condition, sending the power-off instruction to the card reader chip, and returning to Step S2 if the card reader chip meets the power-off condition; returning to Step S2 if the card reader chip does not meet the power-off condition;

when the card reader begins to receive the USB data sent by the upper computer, opening a USB card slot timer; when a time of the USB card slot timer reaches the preset time, entering a USB card slot timer interruption, including:

Step T1, turning off the USB card slot timer, and sending an obtain-card-slot-state instruction to the card reader chip;

Step T2, determining whether a state of the card slot changes, executing Step T3 if the state of the card slot changes; executing Step T2 if the state of the card slot does not change;

Step T3, determining whether there is a card in the card slot, sending a with-a-card response to the upper computer and executing Step T4 if the card is in the card slot; sending a without-a-card response to the upper computer and executing Step T5 if the card is not in the card slot;

Step T4, determining whether a record state of the card slot is with-a-card, turning on a USB card slot timer and exiting a USB card slot timer interruption if the record state of the card slot is with-a-card; recording the state of the card slot as with-a-card, setting a card slot state flag, turning on the USB card slot timer, and exiting the USB card slot timer interruption if the record state of the card slot is not with-a-card;

Step T5, determining whether the record state of the card slot is without-a-card, turning on the USB card slot timer, exiting the USB card slot timer interruption if the record state of the card slot is without-a-card; recording the state of the card slot as without-a-card, setting the card slot state flag, turning on the USB card slot timer, and exiting the USB card slot timer interruption if the record state of the card slot is not without-a-card.

Preferably, Step S5 may be replaced with Step S5':

Step S5', waiting for receiving the APPLE® data sent by the APPLE® device, when the APPLE® data is received, determining the type of the instruction, performing the power-on operation on the card and returning the power-on processing response to the APPLE® device and returning to Step S5' in a case that the instruction is a power-on instruction; performing the power-off operation on the card and returning the power-off successful response to the APPLE® device and returning to Step S5' in a case that the instruction is a power-off instruction; in a case that the instruction is a data exchange APDU instruction, the APDU data in the data exchange APDU instruction is sent to the card to be processed, when the processed result returned by the card is received, the processed result is returned to the APPLE® device, and returning to Step S5';

Step S9 may be replaced by Step S9':

Step S9', waiting for receiving the USB data sent by the upper computer, when the USB data is received, determining type of the instruction, performing the power-on operation on the card and returning the power-on processing response to the upper computer and returning to Step S9' in a case that the instruction is a power-on instruction; performing the power-off operation on the card and returning the power-off successful response to the upper computer and returning to Step S9' in a case that the instruction is a power-off instruction; in a case that the instruction is a data exchange APDU instruction, the APDU data in the data exchange APDU instruction is sent to the card to be processed, when the processed result returned by the card is received, the processed result is returned to the upper computer, and returning to Step S9'.

Compared to the prior art, the present invention has advantages as follow:

the working method for a smart card reader of the present disclosure not only realize communication between a card reader and a general terminal via a USB interface, but also realize communication between the card reader and iPhone 5 cell phone via a lightening interface, so as to realize data transmission between a smart chip and a smart platform by using a traditional USB card reader and the APPLE® certification technology.

BRIEF DESCRIPTION OF ACCOMPANYING DRAWINGS

DETAILED DESCRIPTION OF EMBODIMENTS OF THE PRESENT INVENTION

The technical solution in the embodiments of the present disclosure is further described more clearly and completely with the drawings in the embodiments of the present disclosure. Apparently, embodiments described are just a few of all embodiments of the present disclosure. On the basis of embodiments of the disclosure, all other related embodiments made by common technicians of the field without creative work belong to the scope of the disclosure.

In embodiments of the present disclosure, a card reader can not only connect to an APPLE® device via a lightning interface, but also connect to a terminal via a USB interface; when the APPLE® device, as a host device, sends an instruction to the card reader, the APPLE® device performs correspondingly according to a received instruction and returns a response to the card reader. In embodiments of the present disclosure, the terminal is an upper computer.

Embodiment 1

Figure 1:
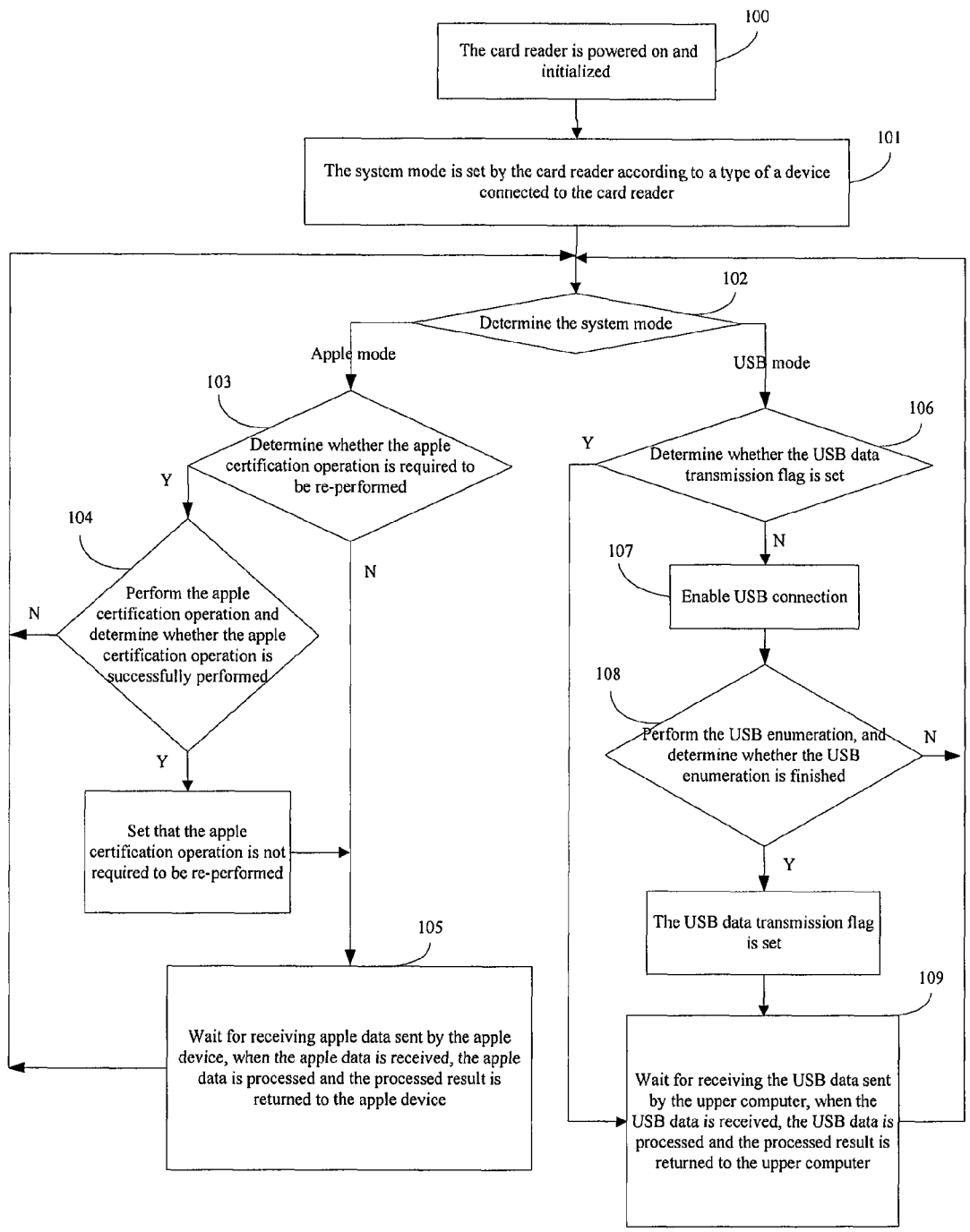
FIG. 1 is a flowchart of a working method for a smart card reader according to Embodiment 1 of the present disclosure.

Embodiment 1 of the present disclosure provides a working method for a smart card reader, as shown in FIG. 1, which includes:

Step 100, a card reader is powered on and initialized;

In Embodiment 1, initialization comprises: a timer interruption flag, a re-certification flag, a system mode flag, a USB data transmission flag, a USB connection flag, a card slot state flag, and resetting a flag configured to mark that USB receiving is finished; setting a flag configured to mark that an APPLE® certification accessory is incorrect;

Step 101, a system mode is set by the card reader according to a type of a device which connects to the card reader;

Step 102, the system mode is determined, execute Step 103 if the system mode is an APPLE® mode; execute Step 106 if the system mode is a USB mode; In Embodiment 1, the system mode may be set when the card reader connects to an upper computer or an APPLE® device, or a device which connects to the card reader is detected regularly in a timer, and the system mode may be set according to the connected device which is detected;

Step 103, determine whether an APPLE® authenticating operation (or verifying operation, or certificating operation) is required to be re-performed, if yes, execute Step 104; if no, execute Step 105;

Step 104, the APPLE® authenticating operation is performed, and determine whether the certificating operation is successfully performed, if yes, set that the APPLE® authenticating operation is not required to be re-performed and execute Step 105; if no, return to Step 102;

In Embodiment 1, more details about performing the APPLE® authenticating operation are provided in Embodiment 7;

Step 105, wait for receiving APPLE® data sent by the APPLE® device, when the APPLE® data is received, the received APPLE® data is processed and the processed result is returned to the APPLE®E device; execute Step 102;

In Embodiment 1, the step that the received APPLE® data is processed and the processed result is returned to the APPLE® device when the APPLE® data is received, comprises that: determine a type of an instruction, the card is powered on and a power-on processing response is returned to the APPLE® device and return to Step 102 in a case that the instruction is a power-on instruction; the card is powered off and a power-off successful response is returned to the APPLE® device and return to step 102 in a case that the instruction is a power-off instruction; in a case that the instruction is a data exchange APDU instruction, an APDU data in the data exchange APDU instruction is sent to the card to be processed, when a processed result returned by the card is received, the processed result is returned to the APPLE® device; return to Step 102;

Concrete realization process of Step 105 is provided in Embodiment 8;

In Embodiment 1, before return to Step 102, Step 105 further includes:

Step F1, determine whether a USB interface connects to a power supply, if yes, execute Step F2; if no, return to Step 102;

Step F2, determine whether an APPLE®-charging event notice is sent to the APPLE® device, if yes, execute Step F3; if no, return to Step 102;

Step F3, the APPLE®-charging event notice is sent to the APPLE® device, return to Step 102.

Step 106, determine whether the USB data transmission flag is set, if yes, execute Step 109; if no, execute Step 107;

Step 107, enable a USB connection;

Step 108, perform a USB enumerating operation, and determine whether the enumerating operation is finished, if yes, the USB data transmission flag is set and execute Step 109; if no, return to Step 102;

Step 109, waiting for receiving USB data sent by the upper computer, when the USB data is received, the USB data is processed and the processed result is returned to the upper computer, and return to Step 102;

In Embodiment 1, the step that the USB data is processed and the processed result is returned to the upper computer when the USB data is received comprises that: determine a type of the instruction, the card is powered on and a power-on processing response is returned to the upper computer and return to Step 102 in a case that the instruction is a power-on instruction; the card is powered off and a power-off successful response is returned to the upper computer and return to Step 102 in a case that the instruction is a power-off instruction; in a case that the instruction is a data exchange APDU instruction, an APDU data in the data exchange APDU instruction is sent to the card to be processed, when a processed result returned by the card is received, the processed result is returned to the upper computer, and return to Step 102;

Concrete realization process of Step 109 is provided in Embodiment 9.

In this Embodiment, the card reader has a lightning interface and a USB interface at the same time which are configured to connect to an APPLE® device and an upper computer respectively, after powered on, the card reader determines a device which connects to it, enter the APPLE® mode if the device which connects the card reader is an APPLE® device; enter the USB mode if the device which connects the card reader is an upper computer.

In this Embodiment, the method has another realization way, which is that in Step 105 and Step 109, the card reader continues to wait for receiving data after it returns the processed result, includes:

Step 105', waiting for receiving the APPLE® data sent by the APPLE® device, when the APPLE® data is received, determining the type of the instruction, the card is powered on and a power-on processing response is returned to the APPLE® device and return to Step 105' in a case that the instruction is a power-on instruction; the card is powered off and a power-off successful response is returned to the APPLE® device and return to Step 105' in a case that the instruction is a power-off instruction; in a case that the instruction is a data exchange APDU instruction, an APDU data in the data exchange APDU instruction is sent to the card to be processed, when a processed result returned by the card is received, the processed result is returned to the APPLE® device, and return to Step 105';

Step 109 may be replaced with Step 109';

Step 109', waiting for receiving the USB data sent by the upper computer, when the USB data is received, determining type of the instruction, the card is powered on and a power-on processing response is returned to the upper computer and return to Step 109' in a case that the instruction is a power-on instruction; the card is powered off and a power-off successful response is returned to the upper computer and return to Step 109' in a case that the instruction is a power-off instruction; in a case that the instruction is a data exchange APDU instruction, an APDU data in the data exchange APDU instruction is sent to the card to be processed, when a processed result returned by the card is received, the processed result is returned to the upper computer, and return to Step 109'.

Embodiment 2

Figure 2:
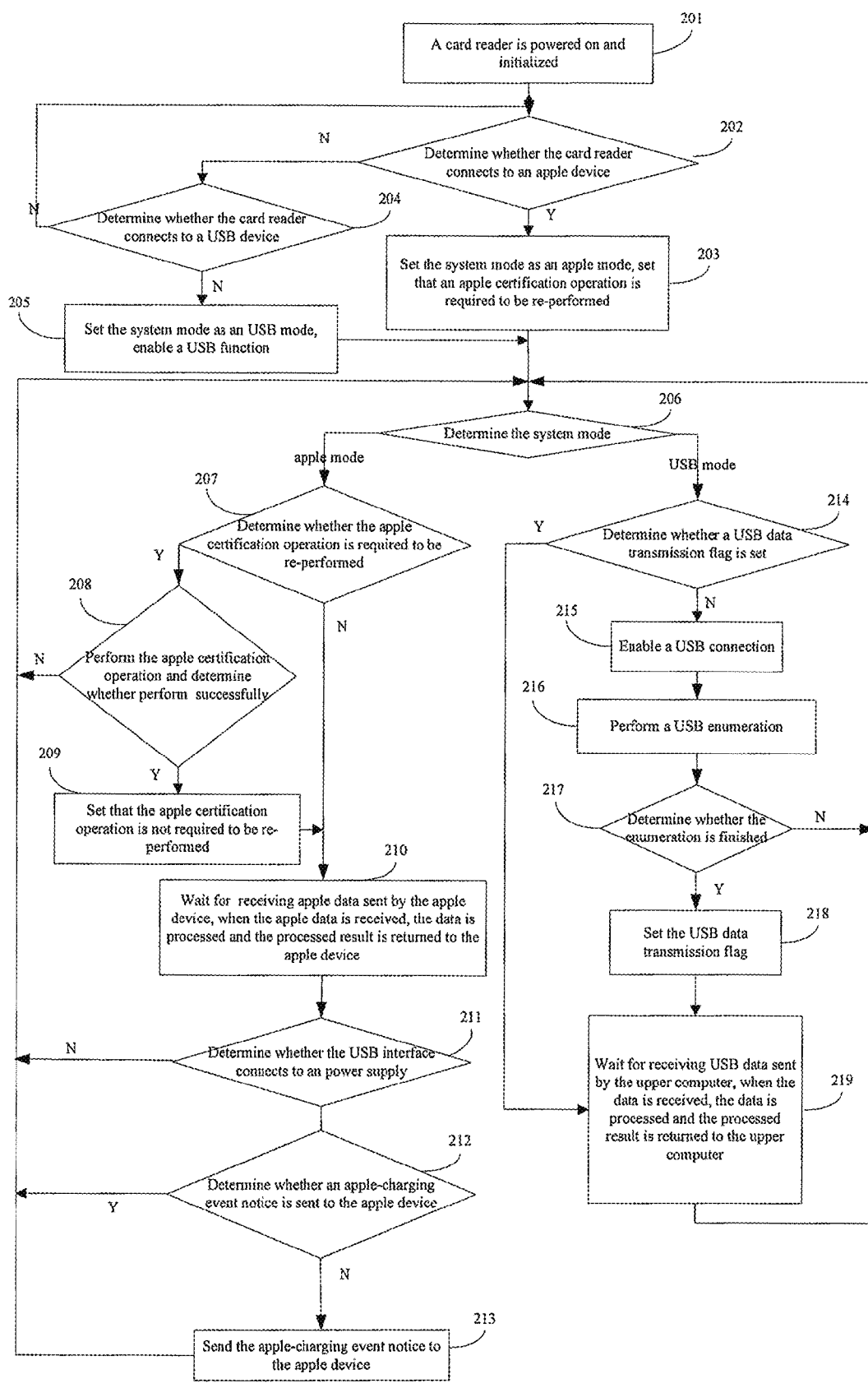
FIG. 2 is a flowchart of a working method for a smart card reader according to Embodiment 2 of the present disclosure.

Embodiment 2 of the present disclosure provides a working method for a smart card reader, as shown by FIG. 2, the method includes:

Step 201, the card reader is powered on and initialized;

Specifically, in Embodiment 2, initialization of the card reader includes: a re-certification flag, a system mode flag, a USB data transmission flag, a USB connection flag, a card slot state flag, and a flag configured to mark that USB receiving is finished, resetting that a flag configured to mark enumeration is finished; setting a flag configured to mark that an APPLE® certification accessory is incorrect;

Step 202, determine whether the card reader connects to an APPLE® device, if yes, execute Step 203; if no, execute Step 204;

In Embodiment 2, determining whether the card reader connects to an APPLE® specifically includes: determining whether an electronic signal of an APPLE® power-supply pin is high power level, if yes, the card reader connects to the APPLE® device; if no, the card reader does not connect to the APPLE® device;

Step 203, the system mode is set as an APPLE® mode, set that the APPLE® authenticating operation is required to be re-performed, and execute Step 206;

In Embodiment 2, setting that the APPLE® authenticating operation is required to be re-performed includes: the re-certification flag is set; setting the system mode as the APPLE® mode comprises: the system mode flag is set as 2;

Step 204, determine whether the card reader connects to a USB device, if yes, execute Step 205; if no, execute Step 202;

In Embodiment 2, Step 204 further comprises: determine a voltage of a USB VCC power-supply pin, a USB interface connects to a device if the voltage is high voltage; the USB interface does not connect to a device if the voltage is low voltage; wherein, high voltage is 5V, and low voltage is 0V;

Step 205, the system is set as a USB mode, enable a USB function, and execute Step 206; In Embodiment 2, setting the system mode as the USB mode comprises: the system mode flag is set as 1;

Step 206, determine the system mode, go to Step 207 if the system mode is the APPLE® mode; go to Step 214 if the system mode is the USB mode;

Specifically, Step 206 comprises: determine a value of the system mode flag, the system mode is the USB mode if the value is 1; the system mode is the APPLE® mode if the value is 2;

Step 207, determine whether the APPLE® authenticating operation is required to be re-performed, if yes, execute Step 208; if no, execute Step 210; In Embodiment 2, Step 207 specifically comprises: determine whether the re-certification flag is set, if yes, the APPLE® authenticating operation is required to be re-performed; if no, the APPLE® authenticating operation is not required to be re-performed;

Step 208, the APPLE® authenticating operation is performed, determine whether the APPLE® authenticating operation is performed successfully, if yes, execute Step 209; if no, return to Step 206;

More details about performing the APPLE® authenticating operation in Embodiment 2 are provided in Embodiment 7;

Specifically, determining whether the APPLE® authenticating operation is successfully performed comprises: determine whether the flag configured to mark the APPLE® certification accessory is incorrect is set, the APPLE® authenticating operation is not successfully performed if the flag is set; the APPLE® authenticating operation is successfully performed if the flag is not set;

Step 209, set that the APPLE® authenticating operation is not required to be re-performed, and execute Step 210;

in the Embodiment, Step 209 specifically is: the re-certification flag is set;

Step 210, wait for receiving APPLE® data sent by the APPLE® device, when the APPLE® data is received, the APPLE® data is processed, and the processed result is returned to the APPLE® device;

concrete realization process of Step 210 in this Embodiment is shown in Embodiment 8;

Step 211, determine whether the USB interface connects to a power source, if yes, execute Step 212; if no, execute Step 206;

Step 212, determine whether an APPLE®-charging event notice is sent to the APPLE® device, if yes, execute Step 206; if no, execute Step 213;

In the Embodiment, after sending an APPLE®-charging instruction to the APPLE® device, the card reader begins to charge the APPLE® device;

Step 213, the APPLE®-charging event notice is sent to the APPLE® device, return to Step 206;

In this Embodiment, charging process is an optional solution, if the charging process is not in the method, return to Step 206 after executing Step 210;

Step 214, determine whether the USB data transmission flag is set, if yes, go to Step 219; if no, go to Step 215;

Step 215, enable the USB connection;

Specifically, enabling the USB connection in this Embodiment is setting the USB connection flag;

Step 216, a USB enumerating operation is performed;

Specifically, in Embodiment 2, performing the USB enumerating operation comprises: an enumeration instruction which is sent by the upper computer is received by the upper computer, after the enumeration is finished, the enumeration flag is set, details about the enumerating operation is not given herein;

Step 217, determine whether the enumeration is finished, go to Step 218 if the enumeration is finished; return to Step 206 if the enumeration is not finished;

Specially, Step 217 comprises determining whether the enumeration finishing flag is set, if yes, the enumeration is finished; otherwise, the enumeration is not finished.

Step 218, the USB data transmission flag is set, and execute Step 219; Step 219, wait for receiving USB data sent by the upper computer, when the USB data is received, the USB data is processed and the processed result is returned to the upper computer;

Concrete realization process of Step 219 in Embodiment 2 is shown in Embodiment 9.

The method in Embodiment 2 provides a realization way that a card reader which puts the APPLE® mode first is powered on and works in only one mode; for instance, after being powered on, the card reader may work in the APPLE® mode if it connects to an APPLE® device; the card reader may work in the USB mode if it connects to a USB device.

Embodiment 3

Figure 3:
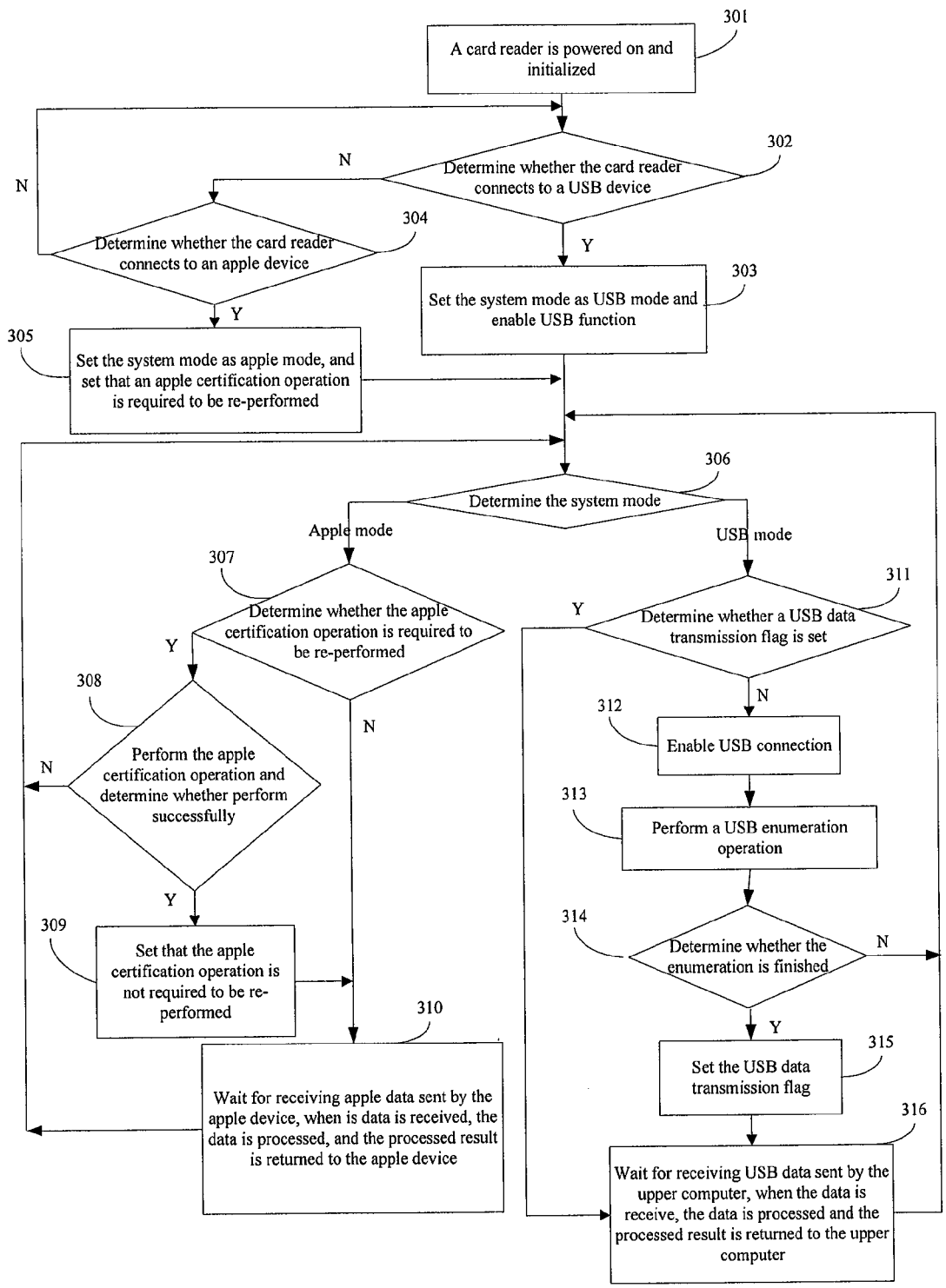
FIG. 3 is a flowchart of a working method for a smart card reader according to Embodiment 3 of the present disclosure.

Embodiment 3 of the present invention provides a working method for a smart card reader, as shown in FIG. 3, the method comprises:

Step 301, the card reader is powered on and initialized;

In Embodiment 3, initialization of the card reader includes: a re-certification flag, a system mode flag, a USB data transmission flag, a USB connection flag, a card slot state flag, a flag configured to mark that USB receiving is finished, resetting a flag configured to mark enumeration is finished; setting a flag configured to mark that an APPLE® certification accessory is incorrect;

Step 302, determine whether the card reader connects to a USB device, if yes, execute Step 303; if no, execute Step 304;

In Embodiment 3, Step 302 specifically comprises: determine a voltage of a USB VCC power-supply pin, the USB interface connects to a device if the voltage is high voltage; the USB interface does not connect to a device if the voltage is low voltage; wherein, high voltage is 5V, and low voltage is 0V;

Step 303, the system mode is set as a USB mode, a USB function is enabled, execute Step 306;

In Embodiment 3, that the system mode is set as the USB mode comprises: the system mode flag is set as 1;

Step 304, determine whether the card reader connects to an APPLE® device, if yes, go to Step 305; if no, return to Step 302;

In Embodiment 3, determining whether the card reader connects to an APPLE® device comprises: determine whether an electronic signal of an APPLE® power-supply pin is a high voltage, if yes, the card reader connects to the APPLE® device; if no, the card reader does not connect to the APPLE® device;

Step 305, set the system mode as an APPLE® mode, set that an APPLE® authenticating operation is required to be re-performed, execute Step 306;

In Embodiment 3, setting that the APPLE® authenticating operation is required to be re-performed is specifically setting the re-certification flag; setting the system mode as the APPLE® mode is setting the system mode flag as 2;

Step 306, determine the system mode, execute 307 if the system mode is the APPLE® mode; execute Step 311 if the system mode is the USB mode;

Specifically, Step 306 comprises: determine a value of the system mode flag, the system mode is the USB mode if the value is 1; the system mode is the APPLE® mode if the value is 2;

Step 307, determine whether the APPLE® authenticating operation is required to be re-performed, if yes, execute Step 308; if no, execute 310;

In Embodiment 3, Step 307 specifically comprises: determine the re-certification flag is set, if yes, the APPLE® authenticating operation is required to be re-performed; if no, the APPLE® authenticating operation is not required to be re-performed;

Step 308, perform the APPLE® authenticating operation, and determine whether the APPLE® authenticating operation is successfully performed; if yes, execute Step 309; if no, return to Step 306;

More details about performing the APPLE® authenticating operation in Embodiment 3 are showed in Embodiment 7;

Determining whether the APPLE® authenticating operation is successfully performed specifically includes: determine whether the flag configured to mark the APPLE® certification accessory is incorrect is set, if yes, the APPLE® authenticating operation is not successfully performed; if no, the APPLE® authenticating operation is successfully performed;

Step 309, set that the APPLE® authenticating operation is not required to be re-performed, execute Step 310;

In Embodiment 3, Step 309 is specifically resetting the re-certification flag;

Step 310, waiting for receiving APPLE® data sent by the APPLE® device, when the APPLE® data is received, the data is processed and the processed result is return to the APPLE® device; return to Step 306;

In Embodiment 3, concrete realization process of Step 310 is provided in Embodiment 8;

Step 311, determine whether the USB data transmission flag is set, if yes, go to Step 316; if no, go to Step 312;

Step 312, enable the USB connection; Specifically, enabling the USB connection in this Embodiment is setting the USB connection flag;

Step 313, perform a USB enumerating operation;

Specifically, in Embodiment 3, performing the USB enumerating operation comprises: an enumeration instruction which is sent by the upper computer is received by the card reader and the enumerating operation is performed, after the enumeration is finished, the enumeration flag is set, details about the enumerating operation is not given herein;

Step 314, determine whether the enumeration is finished, go to Step 315 if the enumeration is finished; return to Step 306 if the enumeration is not finished;

Specifically, Step 314 further includes: determine whether the flag configured to mark the enumeration is finished is set, if yes, the enumeration is finished; if no, the enumeration is not finished;

Step 315, the USB data transmission flag is set, execute Step 316;

Step 316, waiting for receiving USB data sent by the upper computer, when the USB data is received, the USB data is processed and the processed result is returned to the upper computer; and returned to Step 306;

Concrete realization process of Step 316 in Embodiment 3 is given in Embodiment 9.

The method in Embodiment 3 provides a realization way that a card reader which puts the USB mode first is powered on and works in only one mode; for instance, after being powered on, the card reader may work in the USB mode all through if it connects to a USB device; the card reader may work in the APPLE® mode all through if it connects to an APPLE® device.

Embodiment 4

Figure 4:
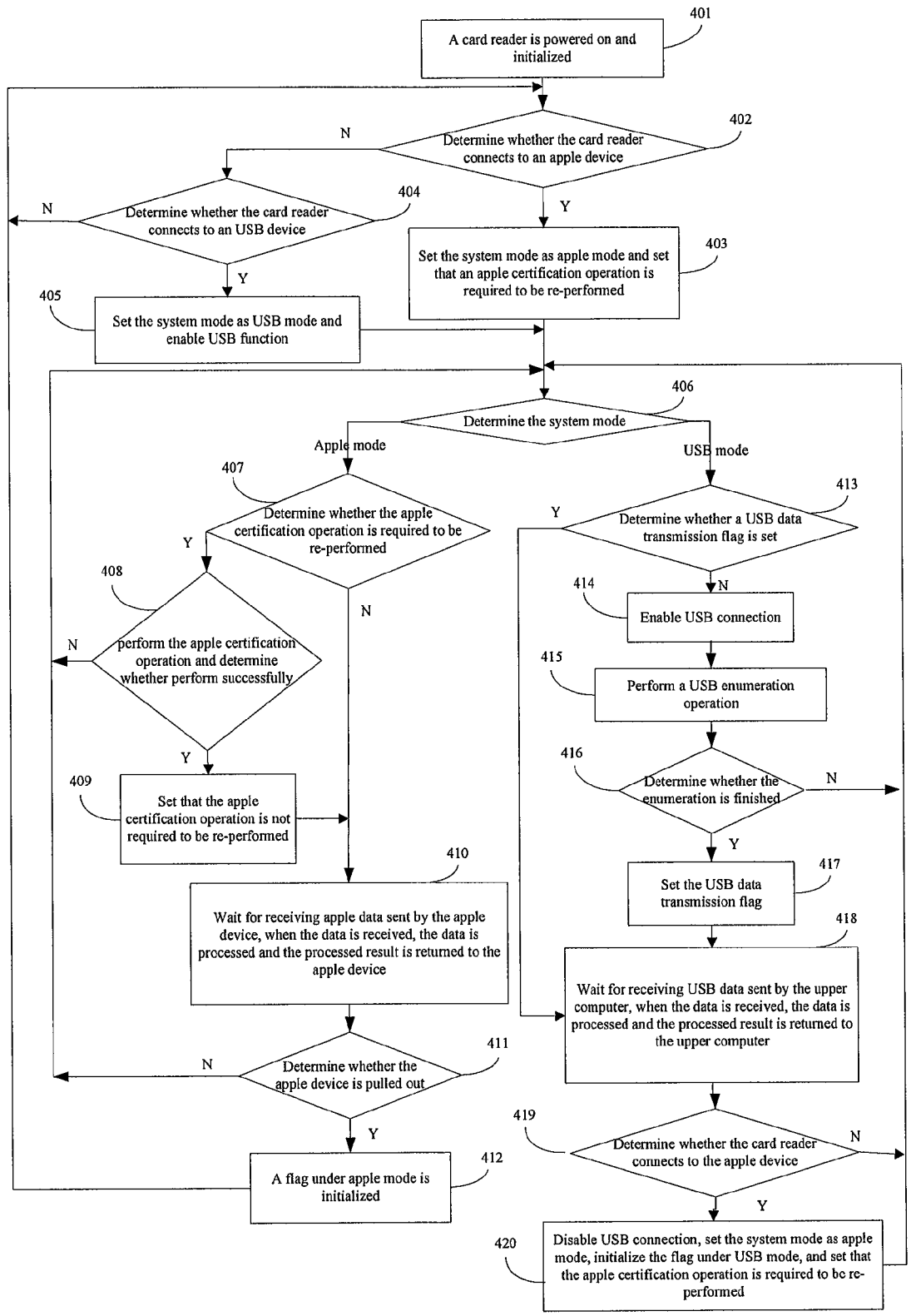
FIG. 4 is a flowchart of a working method for a smart card reader according to Embodiment 4 of the present disclosure.

Embodiment 4 of the present disclosure provides a working method for a smart card reader, as shown is FIG. 4, the method includes:

Step 401, the card reader is powered on and initialized;

Specifically, in Embodiment 4, initialization of the card reader includes: a re-certification flag, a system mode flag, a USB data transmission flag, a USB connection flag, a card slot state flag, and a flag configured to mark that USB receiving is finished, resetting a flag configured to mark enumeration is finished; setting a flag configured to mark that an APPLE® certification accessory is incorrect;

Step 402, determine whether the card reader connects to an APPLE® device, if yes, execute Step 403; if no, execute Step 404;

In Embodiment 4, determining whether the card reader connects to an APPLE® specifically includes: determine whether an electronic signal of an APPLE® power-supply pin is high power level, the card reader connects to the APPLE® device if the electronic signal of the APPLE® power-supply pin is high power level; the card reader does not connect to the APPLE® device if the electronic signal of the APPLE® power-supply pin is not high power level;

Step 403, the system mode is set as an APPLE® mode, set that the APPLE® authenticating operation is required to be re-performed, execute Step 406;

In Embodiment 4, setting the system mode as the APPLE® mode comprises: the system mode flag is set as 2; setting that the APPLE® authenticating operation is required to be re-performed includes: the re-certification flag is set;

Step 404, determine whether the card reader connects to a USB device, if yes, execute Step 405; if no, execute Step 402;

In Embodiment 4, Step 404 further specifically is: determine a voltage of a USB VCC power-supply pin, the USB interface connects to a device if the voltage is high voltage; the USB interface does not connect to a device if the voltage is low voltage; wherein, high voltage is 5V, and low voltage is 0V;

Step 405, the system mode is set as a USB mode, enable a USB function, and execute Step 406;

In Embodiment 4, setting the system mode as the USB mode comprises: the system mode flag is set as 1;

Step 406, determine the system mode, execute Step 407 if the system mode is the APPLE® mode; execute Step 413 if the system mode is the USB mode;

Specifically, Step 406 comprises: determine a value of the system mode flag, the system mode is the USB mode if the value is 1; the system mode is the APPLE® mode if the value is 2;

Step 407, determine whether the APPLE® authenticating operation is required to be re-performed, if yes, execute Step 408; if no, execute Step 410;

In Embodiment 4, Step 407 specifically comprises: determine whether the re-certification flag is set, if yes, the APPLE® authenticating operation is required to be re-performed; if no, the APPLE® authenticating operation is not required to be re-performed;

Step 408, perform the APPLE® authenticating operation, determine whether the APPLE® authenticating operation is performed successfully, if yes, go to Step 409; if no, return to Step 406;

More details about performing the APPLE® authenticating operation in Embodiment 4 are provided in Embodiment 7;

Specifically, determining whether the APPLE® authenticating operation is successfully performed comprises: determine whether the flag configured to mark the APPLE® certification accessory is incorrect is set, if yes, the APPLE® authenticating operation is not successfully performed; if no, the APPLE® authenticating operation is successfully performed;

Step 409, set that the APPLE® authenticating operation is not required to be re-performed, and execute Step 410;

Specifically, in Embodiment 4, setting that the APPLE® authenticating operation is not required to be re-performed specifically is setting the re-certification flag;

Step 410, wait for receiving APPLE® data sent by the APPLE® device, when the APPLE® data is received, the APPLE® data is processed, and the processed result is returned to the APPLE® device;

Concrete realization process of Step 410 in this Embodiment is shown in Embodiment 8;

Step 411, determine whether the APPLE® device is pulled out, go to Step 412 if the APPLE® device is pulled out; go to Step 406 if the APPLE® device is not pulled out;

Step 412, initialize a flag under the APPLE® mode, return to Step 402;

Specifically, in Embodiment 4, initializing the flag under the APPLE® mode comprises: the re-certification flag and the system mode flag are reset, the flag configured to mark the APPLE® certification accessory is incorrect is set;

Step 413, determine whether the USB data transmission flag is set, if yes, execute Step 418; if no, execute Step 414;

Step 414, enable a USB connection;

Specifically, enabling the USB connection in this Embodiment is setting the USB connection flag;

Step 415, perform a USB enumerating operation;

Specifically, in Embodiment 4, performing the USB enumerating operation comprises: an enumeration instruction which is sent by the upper computer is received by the card reader, after the enumeration is finished, the enumeration flag is set, details about the enumerating operation is not given herein;

Step 416, determine whether the enumeration is finished, if yes, execute Step 417; if no, return to Step 406;

Specifically, Step 416 comprises: determine whether the flag configured to mark the enumeration is finished is set, if yes, the enumeration is finished; if no, the enumeration is not finished;

Step 417, the USB data transmission flag is set, execute Step 418;

Step 418, wait for receiving the USB data sent by the upper computer, when the USB data is received, the USB data is processed and the processed result is returned to the upper computer;

Concrete realization process of Step 418 in Embodiment 4 is shown in Embodiment 9.

Step 419, determine whether the card reader connects to an APPLE® device, if yes, execute Step 420; if no, return to Step 406;

Step 420, disable the USB connection, the system mode is set as the APPLE® mode, the flag under the USB mode is initialized, set that the APPLE® authenticating operation is required to be re-performed; return to Step 406;

Specifically, in Embodiment 4, disabling the USB connection is resetting the USB connection flag; initializing the flag under the USB mode comprises: the system mode flag, the USB data transmission flag, the USB connection flag, the card slot state flag, and the flag configured to mark that USB receiving is finished, the flag configured to mark enumeration is finished are reset.

The method in Embodiment 4 provides a realization way, which puts the APPLE® mode first, for exchange between the USB mode and the APPLE® mode; for instance, after the card reader is powered on, determine whether the card reader connects to an APPLE® device, the card reader works in the APPLE® mode if it connects to an APPLE® device, after the APPLE® data is processed, re-determine the connected device if the APPLE® device is pulled out, continue to work in the APPLE® mode if the APPLE® device is not pulled out; for instance, it is a USB device connects to the card reader, the card reader works in the USB mode, after the USB data is processed, the card reader re-connect to an device if an APPLE® device connects to the card reader.

Embodiment 5

Figure 5:
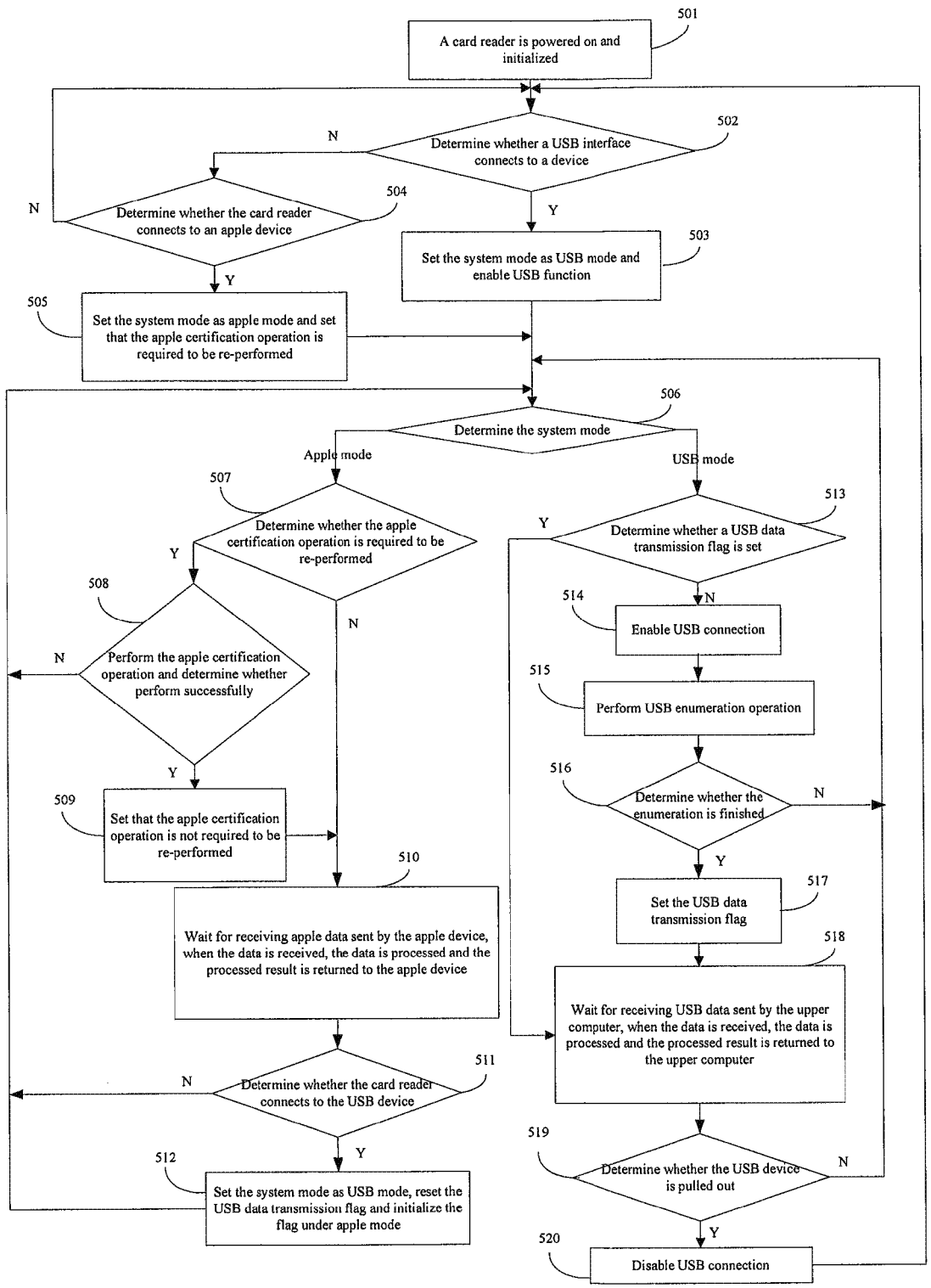
FIG. 5 is a flowchart of a working method for a smart card reader according to Embodiment 5 of the present disclosure.

Embodiment 5 of the present disclosure provides a working method for a smart card reader, as shown in FIG. 5, the method includes:

Step 501, the card reader is powered on and initialized;

Specifically, in Embodiment 5, initialization of the card reader includes: a re-certification flag, a system mode flag, a USB data transmission flag, a USB connection flag, a card slot state flag, and a flag configured to mark that USB receiving is finished, resetting a flag configured to mark enumeration is finished; setting a flag configured to mark that an APPLE® certification accessory is in correct;

Step 502, determine whether a USB interface connects to a device, if yes, execute Step 503; if no, execute Step 504;

In Embodiment 5, Step 502 further comprises: determining a voltage of a USB VCC power-supply pin, the USB interface connects to a device if the voltage is high voltage; the USB interface does not connect to a device if the voltage is low voltage; wherein, high voltage is 5V, and low voltage is 0V;

Step 503, the system mode is set as a USB mode, enable a USB function, and execute Step 506;

In Embodiment 5, setting the system mode as the USB mode specifically is that the system mode flag is set as 1;

Step 504, determine whether the card reader connects to an APPLE® device, if yes, execute Step 505; if no, return to Step 502;

In Embodiment 5, Step 504 specifically is that determine whether an electronic signal of an APPLE® power-supply pin is a high voltage, the card reader connects to the APPLE® device if the electronic signal of the APPLE® power-supply pin is a high voltage; the card reader does not connect to the APPLE® device is the electronic signal of the APPLE® power-supply pin is not a high voltage;

Step 505, set the system mode as an APPLE® mode, set that the APPLE® authenticating operation is required to be re-performed, and execute Step 506;

In Embodiment 5, setting the system mode as the APPLE® mode specifically is setting the system mode flag as 2; setting that the APPLE® authenticating operation is required to be re-performed is setting the re-certification flag;

Step 506, determine the system mode, go to Step 507 if the system mode is the APPLE® mode; go to Step 513 if the system mode is the USB mode;

Step 507, determine whether the APPLE® authenticating operation is required to be re-performed, if yes, execute Step 508; if no, execute Step 510;

In Embodiment 5, Step 507 specifically is that determine whether the re-certification flag is set, if yes, the APPLE® authenticating operation is required to be re-performed; if no, the APPLE® authenticating operation is not required to be re-performed;

Step 508, perform the APPLE® authenticating operation, and determine whether the APPLE® authenticating operation is successfully performed; if yes, execute Step 509; if no, return to Step 506;

More details of performing the APPLE® authenticating operation in Embodiment 5 are showed in Embodiment 7;

Determining whether the APPLE® authenticating operation is successfully performed specifically includes: determine whether the flag configured to mark the APPLE® certification accessory is incorrect is set, if yes, the APPLE® authenticating operation is not successfully performed; if no, the APPLE® authenticating operation is successfully performed;

Step 509, set that the APPLE® authenticating operation is not required to be re-performed, and execute Step 510;

In Embodiment 5, Step 509 is resetting the re-certification flag;

Step 510, wait for receiving APPLE® data sent by the APPLE® device, when the APPLE® data is received, the data is processed and the processed result is return to the APPLE® device; return to Step 306;

In Embodiment 5, concrete realization process of Step 510 is provided in Embodiment 8;

Step 511, determine whether the card reader connects to a USB device, if yes, execute Step 512; if no, return to Step 506;

Step 512, the system mode is set as the USB mode, the USB data transmission flag is reset, the flag under the APPLE® mode is initialized; return to Step 506;

Specifically, in Embodiment 5, that the system mode is set as the USB mode specifically is that the system mode flag is set as 1; that the flag under the APPLE® mode is initialized comprises: the re-certification flag and the system mode flag are reset, the flag configured to mark the APPLE® certification accessory is incorrect is set;

Step 513, determine whether the USB data transmission flag is set, if yes, execute Step 518; if no, execute Step 514;

Step 514, enable a USB connection;

Specifically, enabling the USB connection in this Embodiment is setting the USB connection flag;

Step 515, perform a USB enumerating operation;

Specifically, in Embodiment 5, performing the USB enumerating operation comprises: an enumeration instruction which is sent by the upper computer is received by the card reader and an enumerating operation is performed, after the enumerating operation is finished, the enumeration flag is set, details about the enumerating operation is not given herein;

Step 516, determine whether the enumerating operation is finished, if yes, execute Step 517; if no, return to Step 506;

Specifically, Step 516 further includes: determine whether the flag configured to mark the enumeration is finished is set, if yes, the enumeration is finished; if no, the enumeration is not finished;

Step 517, the USB data transmission flag is set, execute Step 518;

Step 518, waiting for receiving USB data sent by the upper computer, when the USB data is received, the USB data is processed and the processed result is returned to the upper computer;

Concrete realization process of Step 518 in Embodiment 5 is shown in Embodiment 9.

Step 519, determine whether the USB device is pulled out, execute Step 520 if the USB device is pulled out; return to Step 506 if the USB device is not pulled out;

Step 520, disable the USB connection, return to Step 502;

Specifically, disabling the USB connection is Embodiment 5 is resetting the USB connection flag.

The method in Embodiment 5 provides a realization way, which puts the USB mode first, for exchange between the USB mode and the APPLE® mode; for instance, after the card reader is powered on, determine whether the card reader connects to a USB device, the card reader works in the USB mode if it connects to a USB device, after the USB data is processed, re-determine the connected device if the USB device is pulled out, continue to work in the USB mode if the USB device is not pulled out; for instance, it is an APPLE® device connects to the card reader, the card reader works in the APPLE® mode, after the APPLE® data is processed, the card reader re-connect to an device if a USB device connects to the card reader.

Embodiment 6

Figure 6:
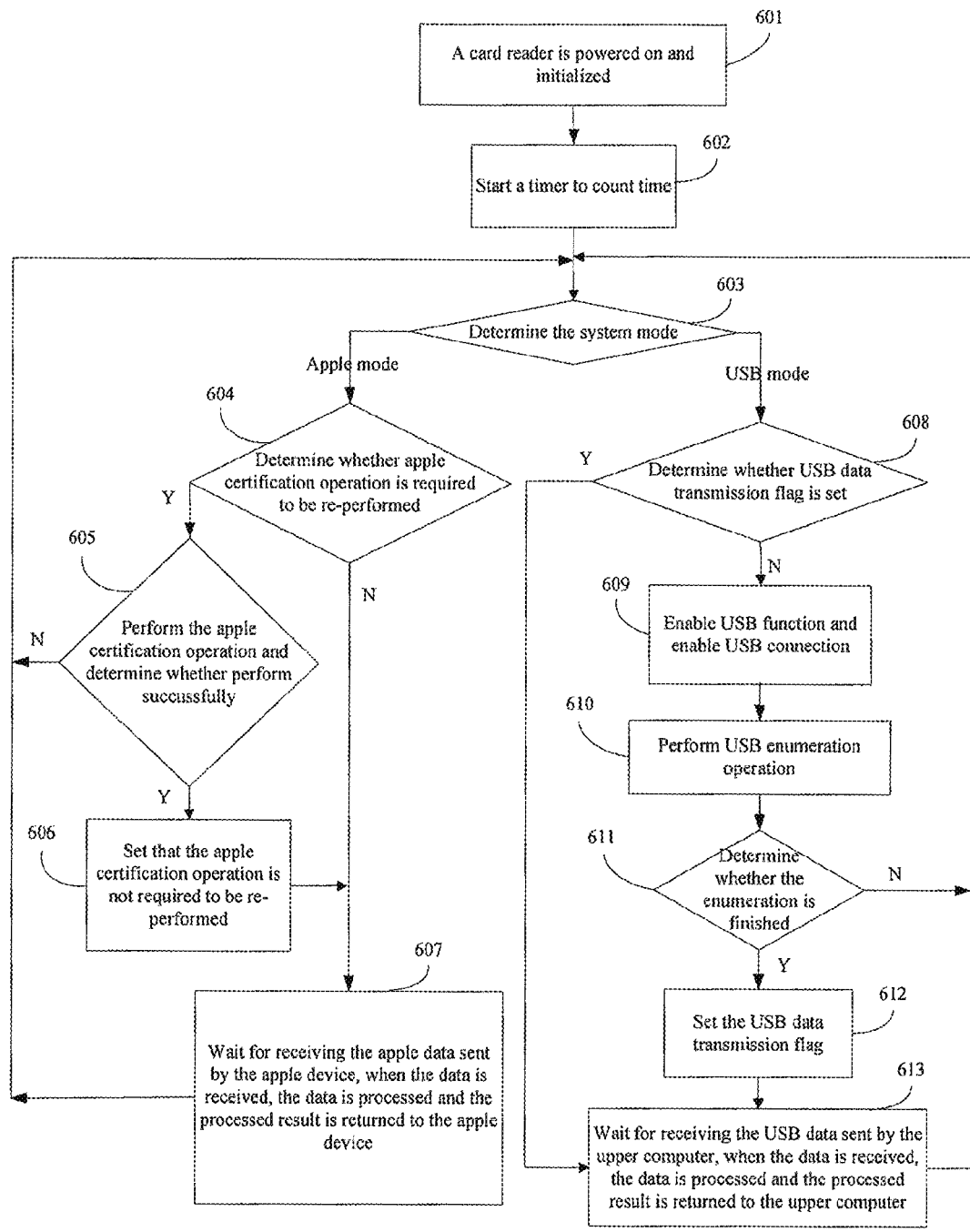
FIG. 6 is a flowchart of a working method for a smart card reader according to Embodiment 6 of the present disclosure.
Figure 7:
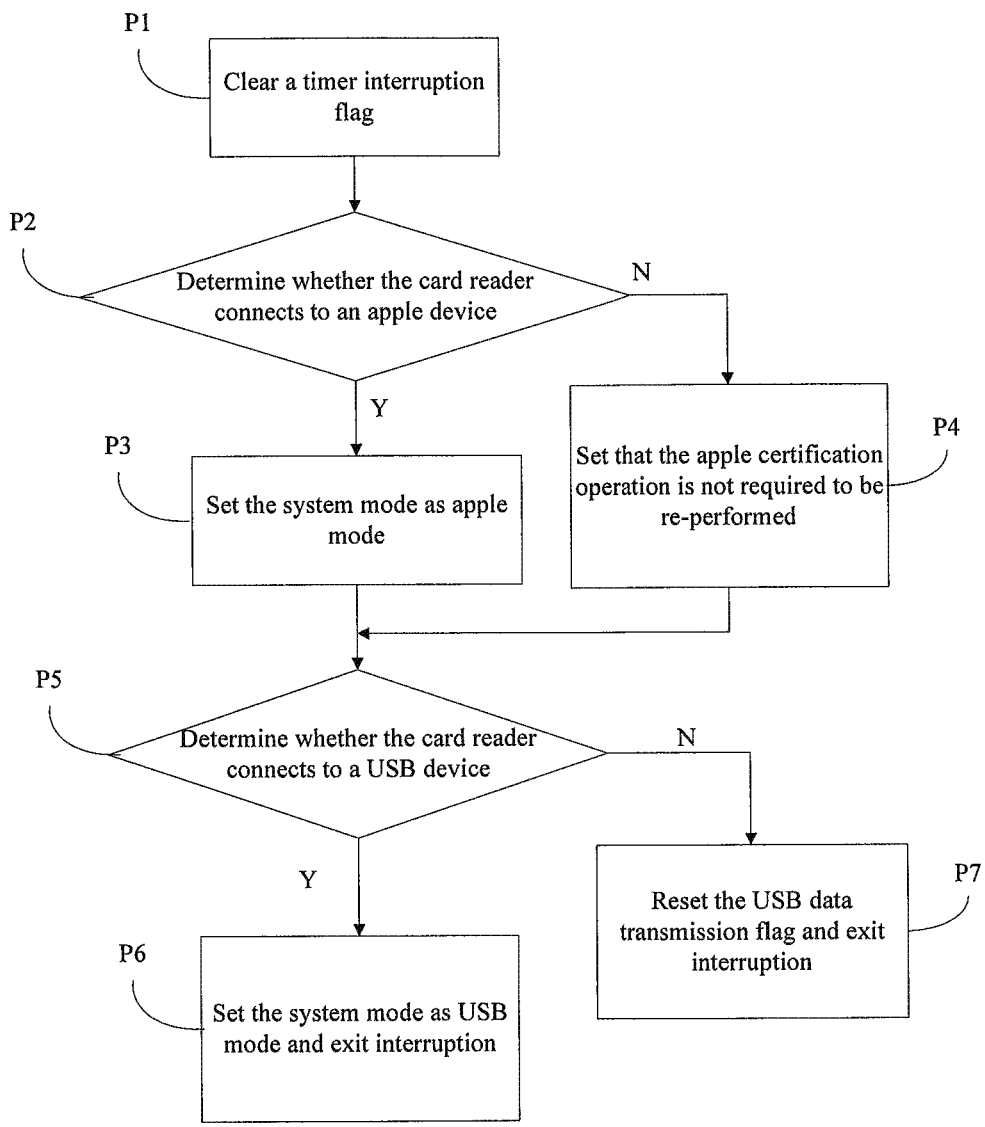
FIG. 7 is a flowchart of timer interrupt processing according to Embodiment 6.

Embodiment 6 of the present disclosure provides a working method for a smart card reader, as shown in FIG. 6, the method comprises:

Step 601, the card reader is powered on and initialized;

Specifically, in Embodiment 6, initialization of the card reader includes: a re-certification flag, a system mode flag, a USB data transmission flag, a USB connection flag, a card slot state flag, and a flag configured to mark that USB receiving is finished, resetting a flag configured to mark enumeration is finished; setting a flag configured to mark that an APPLE® certification accessory is incorrect;

Step 602, start a timer to count time;

Specifically, in Embodiment 6, when time of the timer reaches a preset time, enter a timer interruption;

The timer interruption process, as shown in FIG. 7, includes:

Step P1, clear a timer interruption flag;

Step P2, determine whether the card reader connects to an APPLE® device, go to Step P3 if the card reader connects to an APPLE® device; go to Step P4 if the card reader does not connect to an APPLE® device;

In Embodiment 6, determining whether the card reader connects to an APPLE® device specifically is that determine whether an electronic signal of an APPLE® power-supply pin is high level, if yes, the card reader connects to an APPLE® device; if no, the card reader does not connect to an APPLE® device;

Step P3, the system mode is set as an APPLE® mode, execute Step P5; Step P4, set that the APPLE® authenticating operation is not required to be re-performed, execute Step P5;

Specifically, in Embodiment 6, setting that the APPLE® authenticating operation is not required to be re-performed is that a re-certification flag is reset;

Step P5, determine whether the card reader connects to a USB device, go to Step P6 if the card reader connects to a USB device; go to Step P7 if the card reader does not connect to a USB device;

In Embodiment 6, Step P5 specifically comprises: determine a voltage of a USB VCC power-supply pin, a USB interface connects to a device if the voltage is high voltage; the USB interface does not connect to a device if the voltage is low voltage; wherein, high voltage is 5V, and low voltage is 0V;

Step P6, the system mode is set as a USB mode, exit the timer interruption;

In Embodiment 6, that the system mode is set as a USB mode specifically is that the system mode flag is set as 1;

Step P7, the USB data transmission flag is reset, exit the timer interruption;

Step 603, determine the system mode, go to Step 604 if the system mode is the APPLE® mode; go to Step 608 if the system mode is the USB mode;

Specifically, Step 603 comprises: determine a value of the system mode flag, the system mode is the USB mode if the value is 1; the system mode is the APPLE® mode is the value is 2;

Step 604, determine whether the APPLE® authenticating operation is required to be re-performed, if yes, execute Step 605; if no, execute Step 607;

In Embodiment 6, Step 604 specifically comprises: determine whether the re-certification flag is set, if yes, the APPLE® authenticating operation is required to be re-performed; if no, the APPLE® authenticating operation is not required to be re-performed;

Step 605, perform the APPLE® authenticating operation, and determine whether the APPLE®E authenticating operation is successfully performed, if yes, execute Step 606; if no, return to Step 603;

In Embodiment 6, details about performing the APPLE® authenticating operation are provided in Embodiment 7;

Determining whether the APPLE® authenticating operation is successfully performed specifically comprises: determine whether the flag configured to mark the APPLE® certification accessory is incorrect is set, if yes, APPLE® authenticating operation is successfully performed;

Step 606, set that the APPLE® authenticating operation is not required to be re-performed, execute Step 607;

Step 607, wait for receiving APPLE® data sent by the APPLE® device, when the APPLE® data is received, the data is processed, and the processed result is returned to the APPLE® device; return to Step 603;

In Embodiment 6, the realization process of Step 607 is provided in Embodiment 8;

Step 608, determine whether the USB data transmission flag is set, if yes, execute Step 613, if no, execute Step 609;

Step 609, enable a USB function, enable a USB connection;

Specifically, enabling the USB connection in Embodiment 6 is set the USB connection flag;

Step 610, perform a USB enumeration;

Specifically, in Embodiment 6, performing the USB enumerating operation comprises: an enumeration instruction which is sent by the upper computer is received by the card reader and an enumerating operation is performed, after the enumeration is finished, the enumeration flag is set, details about the enumerating operation is not given herein;

Step 611, determine whether the enumeration is finished, if yes, execute Step 612; if no, return to Step 603;

Specifically, Step 611 further includes: determine whether the flag configured to mark the enumeration is finished is set, if yes, the enumeration is finished; if no, the enumeration is not finished;

Step 612, the USB data transmission flag is set, and execute Step 613;

Step 613, wait for receiving USB data sent by the upper computer, when the USB data is received, the USB data is processed and the processed result is returned to the upper computer; return to Step 603;

Concrete realization process of Step 613 in Embodiment 6 is shown in Embodiment 9.

The method in Embodiment 6 is exchange between the USB mode and the APPLE® mode, after the card reader is powered on, turn on the timer, when the time of the timer reaches a preset time, enter the timer interruption, detect a device which connects to the card reader in the timer interruption and set the corresponding system mode, after exiting the timer interruption, perform corresponding operation according to the determined system mode.

Embodiment 7

Figure 8:
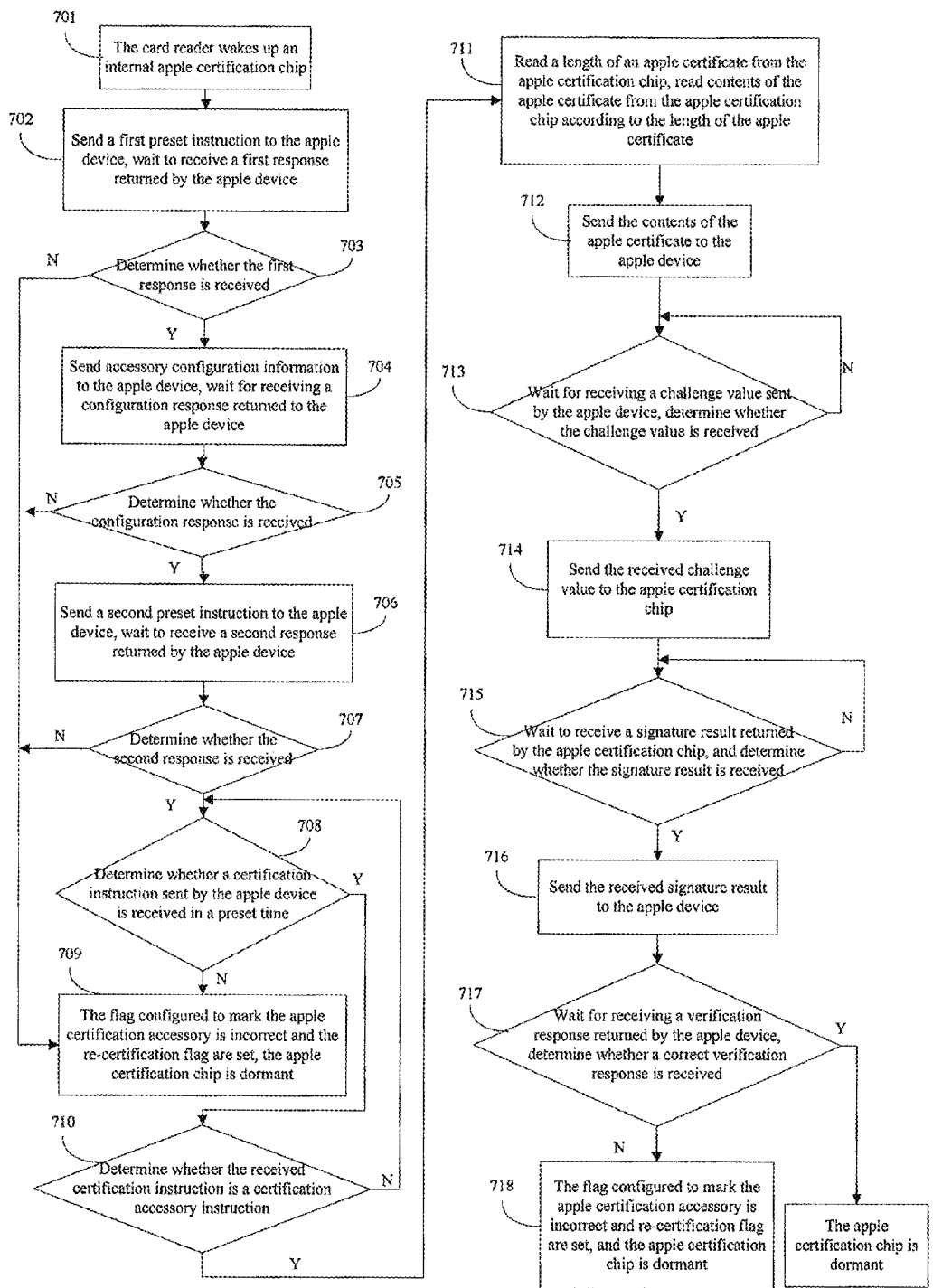
FIG. 8 is a flowchart of details of performing the APPLE® authenticating operation according to Embodiment 7.

Embodiment 7 of the present disclosure provides a realization process of an APPLE® authenticating operation; as shown in FIG. 8, the method comprises:

Step 701, the card reader wakes up an internal APPLE® certification chip;

Step 702, send a first preset instruction to the APPLE® device, waiting for receiving a first response returned by the APPLE® device;

Specifically, the first preset instruction of Embodiment 7 is StarIDPS instruction;

Step 703, determine whether the first response is received, if yes, execute Step 704; if no, execute Step 709;

Step 704, send accessory configuration information to the APPLE® device, wait for receiving a configuration response returned to the APPLE® device;

Specifically, in Embodiment 7, the accessory configuration information comprises a rechargeable flag; the configuration response includes a set rechargeable flag;

Step 705, determine whether the configuration response is received, if yes, execute Step 706; if no, execute Step 709;

Step 706, send a second preset instruction to the APPLE® device, waiting for receiving a second response returned by the APPLE® device;

Specifically, the second preset instruction in Embodiment 7 is EndIDPS instruction;

Step 707, determine whether the second response is received, if yes, execute Step 708; if no, execute Step 709;

Step 708, determine whether a certificating instruction sent by the APPLE® device is received in a preset time, if yes, execute Step 710; if no, execute Step 709;

Step 709, the flag configured to mark the APPLE® certification accessory is incorrect and the re-certification flag are set, the APPLE® certification chip is dormant;

Step 710, determine whether the received certificating instruction is a certification accessory instruction, if yes, execute Step 711; if no, execute Step 708;

Step 711, read a length of an APPLE® certificate from the APPLE® certification chip, read contents of the APPLE® certificate from the APPLE® certification chip according to the length of the APPLE® certificate;

Step 712, send the contents of the APPLE® certificate to the APPLE® device;

In Embodiment 7, between Step 712 and Step 713, the method further comprises:

Step 712', determine whether all of the contents of the certificate is sent, if yes, execute Step 713; if no, continue to send the left contents of the certificate to the APPLE® device, execute Step 712';

In Embodiment 7, if the contents of the certificate is too large to send for one time, it has to be sub-packaged, after the last package of data is sent, set the flag configured to mark the sending is finished; determining whether all of the contents of the certificate is sent comprises: determine the send finished flag is set, if yes, all of the contents of the certificate is sent; if no, not all of the contents of the certificate is sent;

Step 713, wait for receiving a challenge value sent by the APPLE® device, determine whether the challenge value is received, if yes, execute Step 714; if no, execute Step 713;

Step 714, send the received challenge value to the APPLE® certification chip;

In Embodiment 7, when the APPLE® certification chip receives the challenge value, sign the challenge value by using the saved private key according to a preset signature algorithm;

Step 715, wait for receiving a signature result returned by the APPLE® certification chip, and determine whether the signature result is received, if yes, execute Step 716; if no, return to Step 715;

Step 716, send the received signature result to the APPLE® device;

Step 717, wait for receiving a verification response returned by the APPLE® device, determine whether a correct verification response is received, if yes, the APPLE® certification chip is dormant; if no, execute Step 718;

Step 718, the flag configured to mark the APPLE® certification accessory is incorrect and re-certification flag are set, and the APPLE® certification chip is dormant.

Embodiment 8

Figure 9:
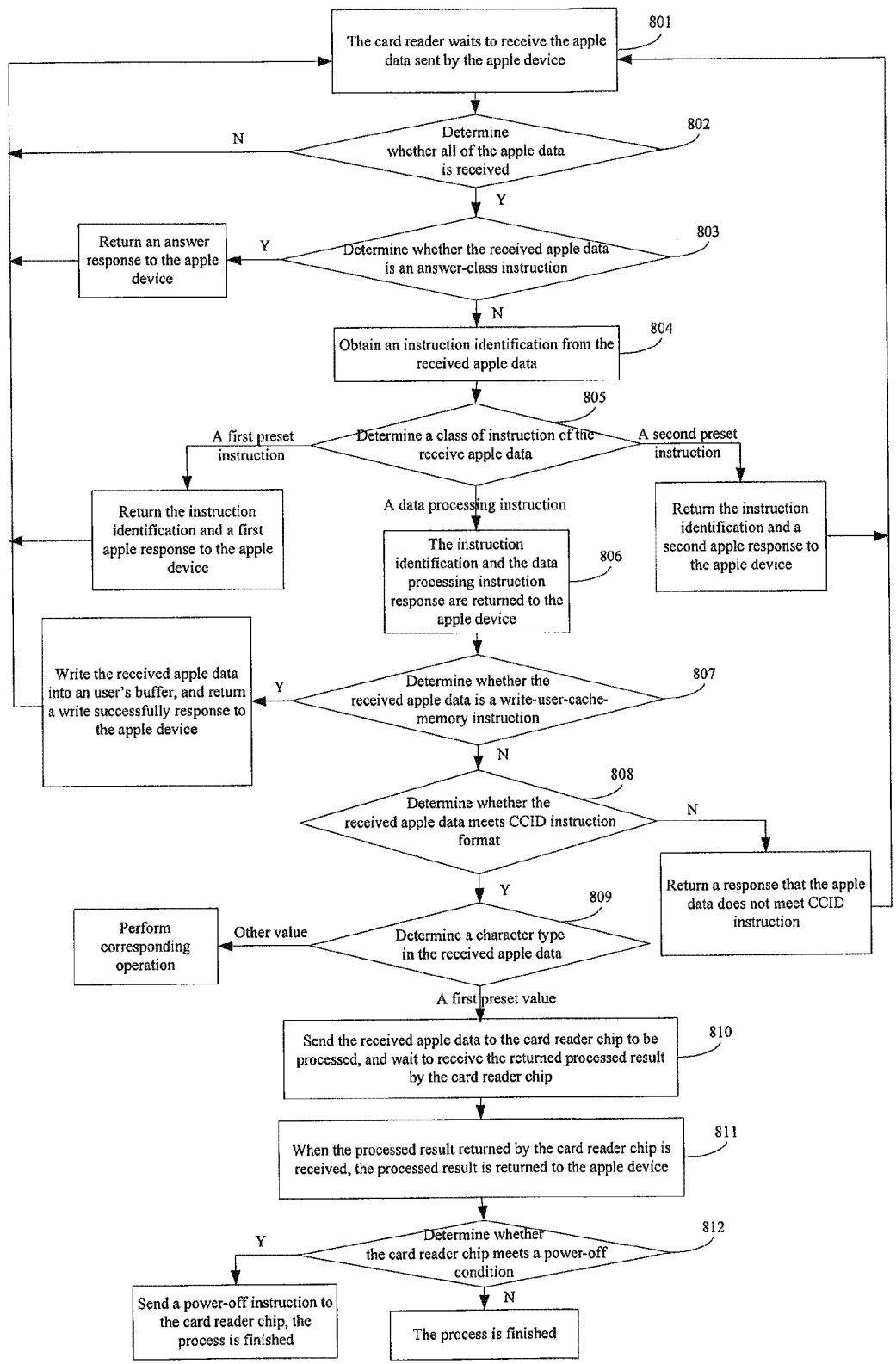
FIG. 9 is a specific flowchart of the step that the card reader waits for receiving the APPLE® data sent by the APPLE® device, when the APPLE® data is received, the APPLE® data is processed and the processed result is returned to the APPLE® device according to Embodiment 8.

Embodiment 8 of the present disclosure provides a concrete realization of the process that a card reader waits to receive APPLE® data sent by the APPLE® device, when the APPLE® data is received, the data is processed, and the processed result is returned to the APPLE® device; the card reader connects to the APPLE® device via a lightning interface, as shown in FIG. 9, the realization of the process includes:

Step 801, the card reader waits for receiving the APPLE® data sent by the APPLE® device;

In Embodiment 8, the APPLE® data sent by the APPLE® device is received by the card reader, and the data is stored into a serial interface buffer;

Step 802, determine whether all of the APPLE® data is received, if yes, execute Step 803; if no, execute Step 801;

In Embodiment 8, when all of the APPLE® data sent by an upper computer is received, an APPLE® interface data flag is set; Step 802 specifically is that determine whether the APPLE® interface data flag is set, if yes, all of the APPLE® data is received; if no, not all of the APPLE® data is received;

Step 803, determine whether the received APPLE® data is an answer-class instruction, if yes, return an answer response to the APPLE® device, and return to Step 801; if no, execute Step 804;

Specifically, the answer-class instruction in Embodiment 8 is ACK instruction;

Step 804, obtain an instruction identification from the received APPLE® data;

Step 805, determine a class of instruction of the receive APPLE® data, return the instruction identification and a first APPLE® response to the APPLE® device and return to Step 801 in a case that the instruction of the received APPLE® data is a first preset instruction; execute Step 806 in a case that the instruction of the received data is a data processing instruction; return the instruction identification and a second APPLE® response to the APPLE® device and return to Step 801 in a case that the instruction of the received APPLE® data is a second preset instruction;

In Embodiment 8, the first preset instruction is Open_Data_Session_For_Protocol instruction, the second preset instruction is Close_Data_Session instruction;

In Embodiment 8, the response is returned by the card reader to the APPLE® device via the lightning interface;

Step 806, the instruction identification and the data processing instruction response are returned to the APPLE® device;

Step 807, determine whether the received APPLE® data is a write-user-cache-memory instruction, if yes, write the received APPLE® data into an user's buffer, and return a write successfully response to the APPLE® device, return to Step 801; if no, execute Step 808;

Step 808, determine whether the received APPLE® data meets CCID instruction format, if yes, execute Step 809; if no, return a response that the APPLE® data does not meet CCID instruction, and return to Step 801;

Step 809, determine a character type in the received APPLE® data, execute Step 810 in a case that the character type is a first preset value; perform corresponding operation in a case that the character type is other value;

In Embodiment 8, determining the character type of the received APPLE® data specifically comprises: determine the data at a first byte of the APPLE® data, execute Step 810 if the data is the first preset value, perform corresponding operation if the data is other value;

Specifically, the first preset value is 0x65; in Embodiment 8, that the character type in the APPLE® data is the first preset value means the received APPLE® data is an obtain-card-slot-state instruction;

In Embodiment 8, performing corresponding operation in a case the type is other value comprises: perform corresponding operation on the received data according to a data transmission type in a case that the type is the second preset value, determine ESCAPE sub-function class in CCID instruction in a case that the type is a third preset value, execute DUKPT processing in a case that the type is a fourth preset value; in a case the type is other value, the type is sent to a card reader chip to perform corresponding process; specifically, the data types comprise: bi-directional encryption transmission, one-way encryption transmission and clear text transmission; the second preset value is 0x6f, the third preset value is 0x6b, the fourth preset value is 0x5b;

Step 810, send the received APPLE® data to the card reader chip to be processed, and wait for receiving the returned processed result by the card reader chip;

Step 811, when the processed result returned by the card reader chip is received, the processed result is returned to the APPLE® device;

Step 812, determine whether the card reader chip meets a power-off condition, if yes, send a power-off instruction to the card reader chip, the process is finished; if no, the process is finished;

In Embodiment 8, the power-off condition of the card reader chip is the card slot state is changed and the card is pulled out.

Embodiment 9

Figure 10:
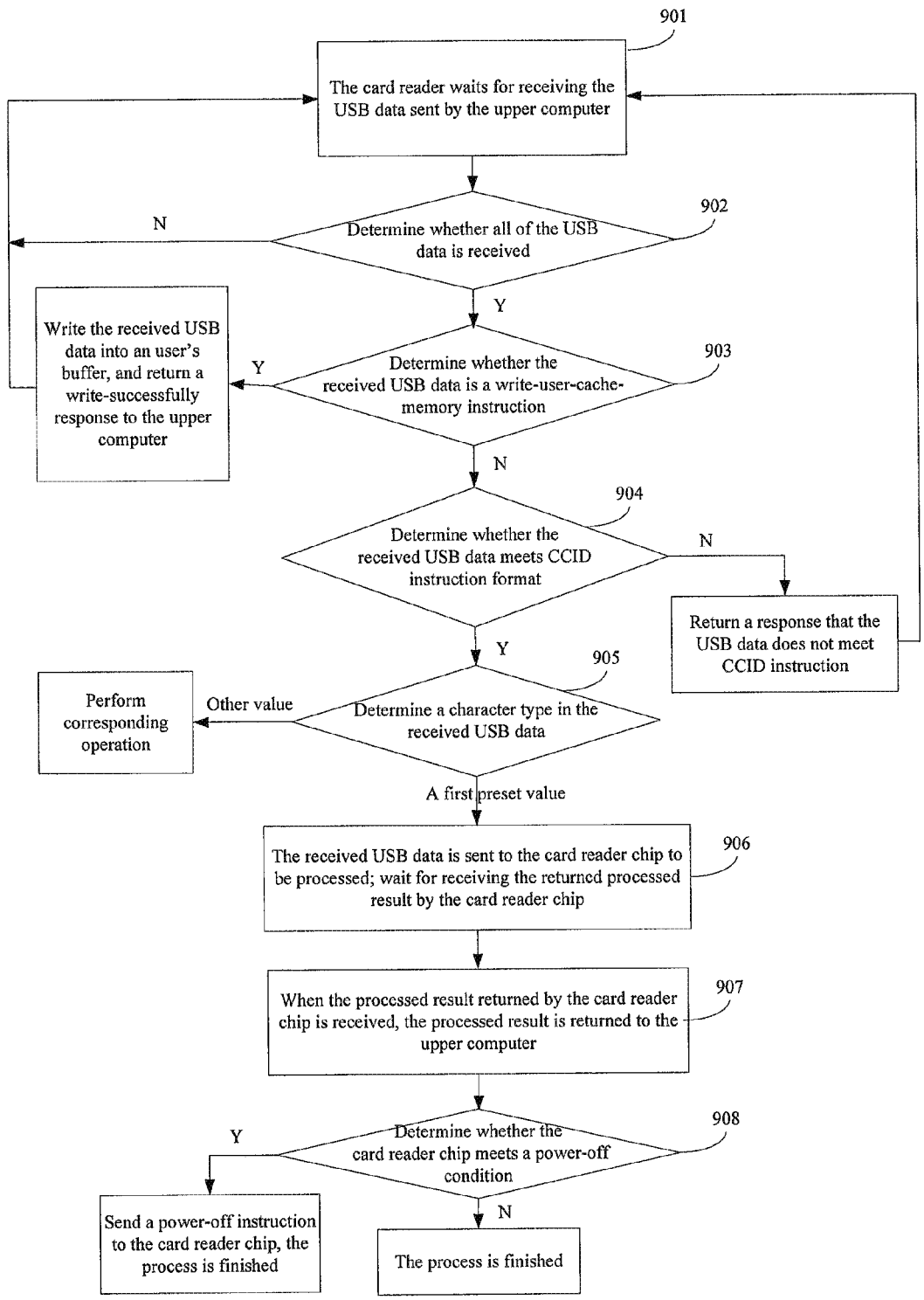
FIG. 10 is a specific flowchart of the step that the card reader waits for receiving the USB data sent by the upper computer, when the USB data is received, the USB data is processed and the processed result is returned to the APPLE® device according to Embodiment 9.

Embodiment 9 of the present disclosure provides a concrete realization of the process that the card reader waits for receiving the USB data sent by the upper computer, when the USB data is received, the data is processed, and the processed result is returned to the upper computer, as shown in FIG. 10, the process includes:

Step 901, the card reader waiting for receiving the USB data sent by the upper computer;

In Embodiment 9, the card reader receives the USB data sent by the upper computer, and the data is stored into a USB buffer; in this Embodiment, when the card reader starts to receive the USB data sent by the upper computer, a USB card slot timer is turned on; when the time of the USB card slot timer reaches a preset value, enter a USB card slot timer interruption, and execute steps from Step T1 to Step T5;

Step T1, turn off the USB card slot state timer, the card reader send the obtain-card-slot state instruction to a card reader chip;

Step T2, determine whether the card slot state is changed, if yes, execute Step T3; if no, return to Step T2;

In Embodiment 9, Step T2 specifically is that determine whether a card slot state flag is set, if yes, the card slot state is changed; if no, the card slot state is not changed;

Step T3, determine whether there is a card in the card slot, if yes, send a with-a-card response to the upper computer, and execute Step T4; if no, send a without-a-card response to the upper computer, and execute Step T5;

Specifically, in Embodiment 9, the with-a-card response is 0x9002; the without-a-card response is 0x9003;

Step T4, determine whether the record card slot state is with-a-card, if yes, turn on the USB card slot timer, exit the USB card slot timer interruption; if no, record the card slot state as with-a-card, the card slot state flag is set, turn on the USB card slot timer, and exit the USB card slot timer interruption;

Step T5, determine whether the recorded card slot state is without-a-card, if yes, turn on the USB card slot timer, exit the USB card slot timer interruption; if no, record the card slot state as without-a-card, the card slot state flag is set, turn on the USB card slot timer, and exit the USB card slot timer interruption;

Step 902, determine whether all of the USB data is received, if yes, execute Step 903; if no, return to Step 901;

In Embodiment 9, after all of the USB data sent by the upper computer is received by the card reader, a flag configured to mark that USB receiving is finished is set;

Step 902 specifically is that determine whether the flag configured to mark that USB receiving is finished is set, if yes, all of the USB data is received; if no, not all of the USB data is received;

Step 903, determine whether the received USB data is a write-user-cache-memory instruction, if yes, write the received USB data into an user's buffer, and return a write-successfully response to the upper computer, return to Step 901; if no, execute Step 904;

Step 904, determine whether the received USB data meets CCID instruction format, if yes, execute Step 905; if no, return a response that the USB data does not meet CCID instruction, and return to Step 901;

Step 905, determine a character type in the received USB data, execute Step 906 in a case that the character type is a first preset value; perform corresponding operation in a case that the character type is other value;

In Embodiment 9, determining the character type of the received USB data specifically comprises: determine the data at a first byte of the USB data, execute Step 906 if the data is the first preset value, perform corresponding operation if the data is other value;

Specifically, the first preset value is 0x65; in Embodiment 9, that the character type in the USB data is the first preset value means the received USB data is an obtain-card-slot-state instruction;

In Embodiment 9, performing corresponding operation in a case the type is other value comprises: perform corresponding operation on the received data according to a data transmission type in a case that the type is the second preset value, determine ESCAPE sub-function class in CCID instruction in a case that the type is a third preset value, execute DUKPT processing in a case that the type is a fourth preset value; in a case the type is other value, the type is sent to a card reader chip to perform corresponding process; specifically, the data types comprise: bi-directional encryption transmission, one-way encryption transmission and clear text transmission; the second preset value is 0x6f, the third preset value is 0x6b, the fourth preset value is 0x5b;

Step 906, the received USB data is sent to the card reader chip to be processed; wait for receiving the returned processed result by the card reader chip;

Step 907, when the processed result returned by the card reader chip is received, the processed result is returned to the upper computer;

Step 908, determine whether the card reader chip meets a power-off condition, if yes, send a power-off instruction to the card reader chip, the process is finished; if no, the process is finished;

In Embodiment 9, the power-off condition of the card reader chip is the card slot state is changed and the card is pulled out.

Figure 11:
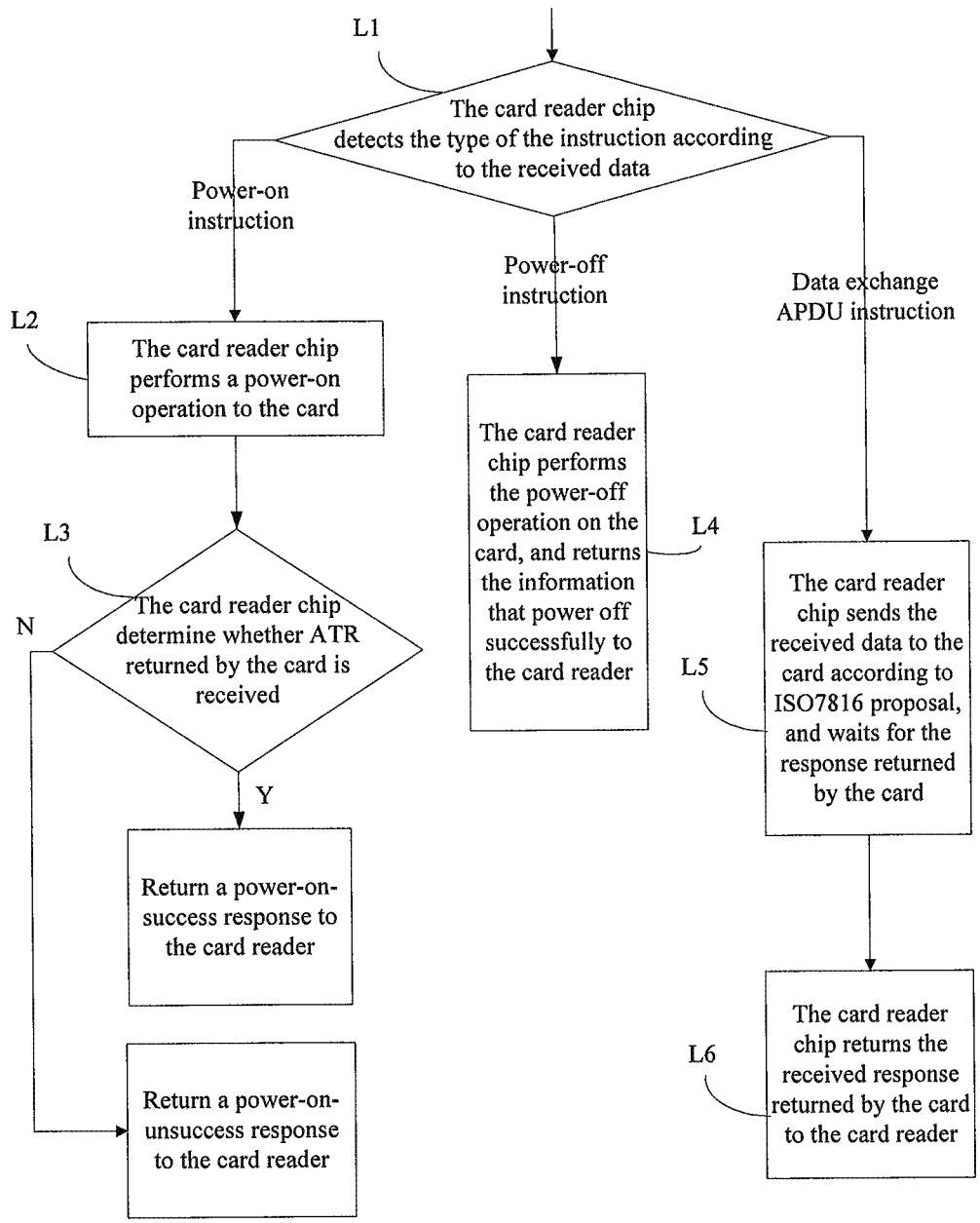
FIG. 11 is a specific flowchart of Step 810 in FIG. 9 and Step 906 in FIG. 10.

Specifically, the concrete realization of the process that the data sent by the card reader is received by the card reader chip receives and the data is processed in Embodiment 8 is identical to the process in Embodiment 9, as shown in FIG. 11, the process comprises:

Step L1, the card reader chip detects the type of the instruction according to the received data, execute Step L2 in a case that the instruction is a power-on instruction; execute Step L4 in a case that the instruction is a power-off instruction; execute Step L5 in the case that the instruction is a data exchange APDU instruction;

Step L2, the card reader chip performs a power-on operation to the card;

Step L3, the card reader chip determines whether ATR returned by the card is received, if yes, return a power-on-success response to the card reader; if no, return a power-on-unsuccess response to the card reader;

In Embodiment 9, ATR comprises card reset parameters such as waiting time, communication rate and T0/T1 proposal;

Step L4, the card reader chip performs the power-off operation on the card, and returns the information that power off successfully to the card reader;

Step L5, the card reader chip sends the received data to the card according to ISO7816 proposal, and waits for the response returned by the card;

Step L6, the card reader chip returns the received response returned by the card to the card reader.

In Embodiment 9, in Step L1, execute Step L7 in a case that the instruction is a set parameter instruction; execute Step L11 in a case that the instruction is an obtain parameter instruction; execute Step L12 in a case that the instruction is a reset parameter instruction; execute Step L13 in a case that the instruction is an expand channel instruction;

Step L7, the card reader chip consults communication parameters with the card according to an instruction parameter in the set parameter instruction;

In Embodiment 9, the communication parameters comprise baud rate;

Step L8, the card reader chip determines whether the communication parameter is successfully consulted, if yes, execute Step L9; if no, execute Step L10;

In Embodiment 9, Step L8 specifically comprises: the card reader chip determines whether the data returned by the card is identical to the data sent to the card, if yes, the communication parameter is successfully consulted; if no, the communication parameter is not successfully consulted;

Step L9, the card reader chip returns communication parameters to the card reader; and correspondly set CPU interface according to the communication parameters.

Step L10, the card reader chip returns a default communication parameter to the card reader;

Step L11, the card reader chip obtains corresponding parameter according to the obtained parameter instruction, and returns the parameter to the card reader;

Step L12, the card reader performs a reset operation according to the reset parameter instruction, and sends the default parameter to the card reader;

Step L13, the card reader chip performs corresponding operation according to the expand channel instruction, and sends the operation result to the card reader.

While all above are preferred embodiments of the present invention, scope of protection is not limited to thereof, variations and changes which can be made by those skilled in the art are also within scope of protection. It is intended that the claims define the scope of the disclosure and that method and structures within the scope of these claims and their equivalents be covered thereby.

The invention claimed is:

1. A working method for a smart card reader, wherein said method comprises:
Step S0, powering on the card reader and beginning initialization; in which the initialization comprises resetting a USB transmission flag;
Step S1, setting a system mode according to a type of a device which connects to the card reader;
Step S2, determining the system mode, executing Step S3 in a case that the system mode is an IOS mode; executing Step S6 in a case that the system mode is a USB mode;
Step S3, determining whether an authenticating operation is required to be re-performed, if yes, executing Step S4, otherwise executing Step S5;
Step S4, performing the authenticating operation, and determining whether the certificating operation is successfully performed, if yes, setting 'the authenticating operation is not required to be re-performed', otherwise, executing Step S5;
Step S5, waiting for receiving data sent by an IOS platform compatible device, when the data is received, determining a type of an instruction, performing a power-on operation on the card and returning a power-on processing response to the IOS platform compatible device, and returning to Step S2 in a case that the instruction is a power-on instruction; performing a power-off operation on the card and returning a power-off successful response to the IOS platform compatible device, and returning to Step S2 in a case that the instruction is a power-off instruction; sending APDU data in the data exchange APDU instruction to the card to be processed in a case that the instruction is a data exchange APDU instruction, when a processed result returned by the card is received, the processed result is returned to the IOS platform compatible device, and returning to Step S2;
Step S6, determining whether the USB data transmission flag is set, if yes, executing Step S9, otherwise, executing Step S7;
Step S7, enabling USB connection;
Step S8, performing a USB enumerating operation, and determining whether the enumerating operation is finished, if yes, setting the USB data transmission flag and executing Step S9, otherwise, returning to Step S2; and
Step S9, waiting for receiving USB data sent by an upper computer, determining a type of an instruction when the USB data is received, performing a power-on operation on the card and returning an power-on processing response to the upper computer, and returning to Step S2 in a case that the instruction is a power-on instruction; performing a power-off operation on the card and returning a power-on successful response to the upper computer, and returning to Step S2 in a case that the instruction is a power-off instruction; sending APDU data in the data exchange APDU instruction to the card to be processed in a case that the instruction is a data exchange APDU instruction, when a processed result returned by the card is received, the processed result is returned to the upper computer, and returning to Step S2.

2. The method of claim 1, wherein, before returning to Step S2, Step S5 further comprises:
Step F1, determining whether a USB interface connects to a power supply, if yes, executing Step F2, otherwise, returning to Step S2;
Step F2, determining whether an IOS-charging event notice is sent to the IOS platform compatible device, if yes, executing Step F3, otherwise, returning to Step S2;
Step F3, sending the IOS-charging event notice to the IOS platform compatible device, and returning to Step S2.

3. The method of claim 1, wherein Step S1 further comprises:
Step A1, determining whether the card reader connects to an IOS platform compatible device, if yes, executing Step A2, otherwise, executing Step A3;
Step A2, setting the system mode as the IOS mode, setting that the authenticating operation is required to be re-performed, and executing Step S2;
Step A3, determining whether the card reader connects to a USB device, if yes, executing Step A4, otherwise, returning to Step A1;
Step A4, setting the system mode as the USB mode, enabling a USB function, and executing Step S2.

4. The method of claim 3, wherein
before returning to Step S2, Step S5 further comprises: determining whether the IOS platform compatible device is pulled out, if yes, initializing a flag under the IOS mode, and returning to Step S2, otherwise, directly returning to Step S2; and
before returning to Step S2, Step S9 further comprising: determining whether the card reader connects to an IOS platform compatible device, if yes, disabling the USB connection, setting the system mode as the IOS mode, initializing the flag under the USB mode, setting that the authenticating operation is required to be re-performed, and returning to Step S2, otherwise, returning to Step S2 directly.

5. The method of claim 1, wherein Step S1 further comprises:
Step B1, determining whether the card reader connects to a USB device, if yes, executing Step B2, otherwise, returning to Step B3;
Step B2, setting the system mode as the USB mode, enabling the USB function, and executing Step S2;
Step B3, determining whether the card reader connects to an IOS platform compatible device, if yes, executing Step B4, otherwise, returning to Step B1; and
Step B4, setting the system mode as the IOS mode, and setting that the authenticating operation is required to be re-performed, and executing Step S2.

6. The method of claim 5, wherein
before returning to Step S2, Step S5 further comprises: determining whether the card reader connects to a USB device, if yes, setting the system mode as the USB mode and resetting the USB data transmission flag, initializing the flag under the IOS mode, and returning to Step S2, otherwise, returning to Step S2 directly; and
before returning to Step S2, Step S9 further comprising: determining whether the USB device is pulled out, if yes, disabling the USB connection and returning to Step S2, otherwise, returning to Step S2 directly.

7. The method of claim 1, wherein Step S1 further comprises: starting a timer to count time;
when a time timed by the timer reaches a preset time, entering a timer interruption;
the timer interruption comprises:
Step P1, clearing a timer interruption flag in the timer;
Step P2, determining whether the card reader connects to an IOS platform compatible device, if yes, executing Step P3, otherwise, executing Step P4;
Step P3, setting the system mode as the IOS mode, and executing Step P5;
Step P4, setting that the authenticating operation is not required to be re-performed, and executing Step P5;
Step P5, determining whether the card reader connects to a USB device, if yes, executing Step S6, otherwise, executing Step P7;
Step P6, setting the system mode as the USB mode, and exiting the timer interruption;
Step P7, resetting the USB data transmission flag, and exiting the timer interruption.

8. The method of claim 1, wherein performing the authenticating operation comprises:
Step S4-1, waking up, by the card reader, an IOS certification chip;
Step S4-2, sending a first preset instruction to the IOS platform compatible device, and waiting for receiving a first response returned by the IOS platform compatible device;
Step S4-3, determining whether the first response is received, if yes, executing Step S4-4, otherwise, executing Step S4-9;
Step S4-4, sending accessory configuration information to the IOS platform compatible device, and waiting for receiving a configuration response returned by the IOS platform compatible device; in which the accessory configuration information comprises a rechargeable flag; and the configuration response includes a set rechargeable flag;
Step S4-5, determining whether the configuration response is received, if yes, executing Step S4-6, otherwise, executing Step S4-9;
Step S4-6, sending a second preset instruction to the IOS platform compatible device, and waiting for receiving a second response returned by the IOS platform compatible device;
Step S4-7, determining whether the second response is received, if yes, executing Step S4-8, otherwise, executing Step S4-9;
Step S4-8, determining whether a certificating instruction sent by the IOS platform compatible device is received within the preset time, if yes, executing Step S4-10, otherwise, executing Step S4-9;
Step S4-9, setting a flag configured to mark that an IOS certification accessory is incorrect and a re-certification flag, and the IOS certification chip is dormant, and performing the authenticating operation is finished;
Step S4-10, determining whether the certificating instruction is a certification accessory instruction, if yes, executing Step S4-11, otherwise, returning to Step S4-8;
Step S4-11, reading a length of an IOS certificate from the IOS certification chip, reading contents of the certificate from the IOS certification chip according to the length of the IOS certificate;
Step S4-12, sending the contents of the certificate to the IOS platform compatible device;
Step S4-13, waiting for receiving a challenge value sent by the IOS platform compatible device, and determining whether the challenge value is received, if yes, executing Step S4-14, otherwise, returning to Step S4-13;

Step S4-14, sending the received challenge value to the IOS certification chip;

Step S4-15, waiting for receiving a signature result returned by the IOS certification chip, and determine whether the signature result is received, if yes, executing Step S4-16, otherwise, returning to S4-15;

Step S4-16, sending the received signature result to the IOS platform compatible device;

Step S4-17, waiting for receiving a certification response returned by the IOS platform compatible device, and determining whether a correct certification response is received, if yes, the IOS certification chip is dormant and performing the authenticating operation is finished, otherwise, executing Step S4-18;

Step S4-18, setting the flag configured to mark the IOS certification accessory is incorrect and the re-certification flag, the IOS certification chip is dormant, and performing the authenticating operation is finished.

9. The method of claim 8, wherein between Step S4-12 and Step S4-13, said method comprises:

Step S4-12', determining whether all of the contents of the certificate are sent, if yes, executing Step S4-13, otherwise, continuing to send left contents to the IOS platform compatible device and executing Step S4-12'.

10. The method of claim 1, wherein Step S5 comprises:

Step S5-1, waiting for receiving the data sent by the IOS platform compatible device;

Step S5-2, determining whether all of the data is received, if yes, executing Step S5-3, otherwise, returning to Step S5-1;

Step S5-3, determining whether the received data is an answer class instruction, if yes, returning an answer response to the IOS platform compatible device and returning to Step S5-1, otherwise, executing Step S5-4;

Step S5-4, obtaining an instruction flag in the received data;

Step S5-5, determining the type of the received data, returning the instruction flag and a first response to the IOS platform compatible device and returning to Step S5-1 in a case that the received data is the first preset instruction; executing Step S5-6 in a case that the received data is a data processing instruction; returning the instruction flag and a second response to the IOS platform compatible device and returning to Step S5-1 in a case that the received data is the second preset instruction;

Step S5-6, returning the instruction flag and a data processing instruction response to the IOS platform compatible device;

Step S5-7, determining whether the received data is a write-user-cache-memory instruction, if yes, writing the received data into an user cache memory, returning an successfully writing response to the IOS platform compatible device, and returning to Step S5-1, otherwise, executing Step S5-8;

Step S5-8, determining whether the received data meets a format of CCID instruction, if yes, executing Step S5-9, otherwise, returning a response that CCID instruction is not applied to the data to the IOS platform compatible device, and returning to Step S5-1; Step S5-9, determining a character type in the received data, executing Step S5-10 in a case that the character type is a first preset value; performing corresponding operation in a case that the character type is other value;

Step S5-10, determining the type of an instruction according to the received data, performing the power-on operation on the card and returning a power-on processing response to the IOS platform compatible device and executing Step S5-11 in a case that the instruction is a power-on instruction; performing the power-off operation on the card and returning a power-off successful response to the IOS platform compatible device and executing Step S5-11 in a case that the instruction is a power-off instruction; sending APDU data in the data exchange APDU instruction to the card to be processed in a case that the instruction is a data exchange APDU instruction, when the processed result returned by the card is received, the processed result is returned to the IOS platform compatible device, and returning to Step S5-11;

Step S5-11, determining whether the card reader chip meets a power-off condition, if yes, sending the power-off instruction to the card reader chip, and returning to Step S2, otherwise, returning to Step S2 directly.

11. The method of claim 1, wherein Step S9 comprises:

Step S9-1, waiting for receiving the USB data sent by the upper computer;

Step S9-2, determining whether all of the USB data is received, if yes, executing Step S9-3, otherwise, executing Step S9-1;

Step S9-3, determining whether the received USB data is the write-user-cache-memory instruction, if yes, writing the received USB data into the user cache memory, and returning the successfully writing response to the upper computer, and returning to Step S9-1, otherwise, executing Step S9-4;

Step S9-4, determining whether the received USB data meets the format of CCID instruction, if yes, executing Step S9-5, otherwise, returning that CCID instruction is not applied to the USB data to the upper computer, and returning to Step S9-1;

Step S9-5, determining the character type in the received USB data, executing Step S9-6 in a case that the character type is the first preset value; executing corresponding operation in a case that the character type is other value;

Step S9-6, determining the type of the instruction according to the received USB data, performing the power-on operation on the card and returning the power-on processing response to the IOS platform compatible device and executing Step S9-7 in a case that the instruction is a power-on instruction; performing the power-off operation on the card and returning the power-off successful response to the IOS platform compatible device and executing Step S9-7 in a case that the instruction is a power-off instruction; sending the APDU data in the data exchange APDU instruction to the card to be processed in a case that the instruction is a data exchange APDU instruction, when the processed result returned by the card is received, the processed result is returned to the IOS platform compatible device, and returning to Step S9-7;

Step S9-7, determining whether the card reader chip meets a power-off condition, if yes, sending the power-off instruction to the card reader chip, and returning to Step S2, otherwise, returning to Step S2 directly;

when the card reader begins to receive the USB data sent by the upper computer, turning on a USB card slot timer; when a time of the USB card slot timer reaches the preset time, entering a USB card slot timer interruption, including:

Step T1, turning off the USB card slot timer, and sending an obtain-card-slot-state instruction to the card chip;

Step T2, determining whether the state of the card slot changes, if yes, executing Step T3, otherwise, executing Step T2;

Step T3, determining whether there is a card in the card slot, if yes, sending a with-a-card response to the upper computer and executing Step T4, otherwise, sending a without-a-card response to the upper computer and executing Step T5;

Step T4, determining whether a record state of the card slot is with-a-card, turning on the USB card slot timer and exiting the USB card slot timer interruption if the record state of the card slot is with-a-card; while recording the state of the card slot as with-a-card, setting a card slot state flag, turning on the USB card slot timer, and exiting the USB card slot timer interruption if the record state of the card slot is not with-a-card;

Step T5, determining whether the record state of the card slot is without-a-card, turning on the USB card slot timer, exiting the USB card slot timer interruption if the record state of the card slot is without-a-card; while recording the state of the card slot as without-a-card, setting the card slot state flag, turning on the USB card slot timer, and exiting the USB card slot timer interruption if the record state of the card slot is not without-a-card.

12. The method of claim 1, wherein Step S5 may be replaced with Step S5',

Step S5', waiting for receiving the data sent by the IOS platform compatible device, when the data is received, determining the type of the instruction, performing the power-on operation on the card and returning the power-on processing response to the IOS platform compatible device and returning to Step S5' in a case that the instruction is a power-on instruction; performing the power-off operation on the card and returning the power-off successful response to the IOS platform compatible device and returning to Step S5' in a case that the instruction is a power-off instruction; and sending the APDU data in the data exchange APDU instruction to the card to be processed in a case that the instruction is a data exchange APDU instruction, when the processed result returned by the card is received, the processed result is returned to the IOS platform compatible device, and returning to Step S5';

Step S9 may be replaced by Step S9':

Step S9', waiting for receiving the USB data sent by the upper computer, when the USB data is received, determining the type of the instruction, performing the power-on operation on the card and returning the power-on processing response to the upper computer and returning to Step S9' in a case that the instruction is a power-on instruction; performing the power-off operation on the card and returning the power-off successful response to the upper computer and returning to Step S9' in a case that the instruction is a power-off instruction; and sending the APDU data in the data exchange APDU instruction to the card to be processed in a case that the instruction is a data exchange APDU instruction, when the processed result returned by the card is received, the processed result is returned to the upper computer, and returning to Step S9'.

* * * * *